(12) United States Patent
Liao et al.

(10) Patent No.: US 11,378,875 B2
(45) Date of Patent: *Jul. 5, 2022

(54) ILLUMINATION SYSTEM AND PROJECTION APPARATUS

(71) Applicant: Coretronic Corporation, Hsin-Chu (TW)

(72) Inventors: Chien-Chung Liao, Hsin-Chu (TW); Hung-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,747

(22) Filed: Mar. 24, 2021

(65) Prior Publication Data

US 2021/0364901 A1     Nov. 25, 2021

(30) Foreign Application Priority Data

May 19, 2020   (CN) .......................... 202020836073.5

(51) Int. Cl.
*G03B 21/20*     (2006.01)
*G03B 21/14*     (2006.01)
(Continued)

(52) U.S. Cl.
CPC ......... *G03B 21/2033* (2013.01); *G02B 27/48* (2013.01); *G03B 21/142* (2013.01); *G03B 21/2053* (2013.01); *H04N 9/3114* (2013.01)

(58) Field of Classification Search
CPC .... G03B 21/00; G03B 21/14; G03B 21/2033; G03B 21/2053; H04N 9/31; H04N 9/3102; H04N 9/3114; H04N 9/3117; G02B 27/48
See application file for complete search history.

(56) References Cited

U.S. PATENT DOCUMENTS 11,112,684 B2 *   9/2021   Liu ..................... G03B 21/208
11,163,227 B2 *   11/2021   Lin ....................... G03B 33/08
(Continued)

FOREIGN PATENT DOCUMENTS

CN        103888702        6/2014
CN        105116675        12/2015
(Continued)

OTHER PUBLICATIONS

"Office Action of U.S. Related U.S. Appl. No. 17/209,088", dated Dec. 8, 2021, pp. 1-16.

Primary Examiner — William C. Dowling
(74) Attorney, Agent, or Firm — JCIPRNET

(57) ABSTRACT

An illumination system including a first excitation light source, a second excitation light source and a first diffusion element is provided. The first excitation light source emits a first excitation light beam, and the second excitation light source emits a second excitation light beam. The first and second excitation light beams have different colors. The first diffusion element is disposed on transmission paths of the first excitation light beam and the second excitation light beam, and the first diffusion element includes a first diffusion region and a second diffusion region with different diffusion degrees, wherein at least one of the first excitation light beam and the second excitation light beam sequentially passes through the first diffusion region and the second diffusion region. A projection apparatus is also provided. The illumination system of the invention effectively mitigates a speckle phenomenon of the excitation light beams to achieve a better optical efficiency.

19 Claims, 15 Drawing Sheets

(51) Int. Cl.
 *G03B 27/48* (2006.01)
 *H04N 9/31* (2006.01)
 *G02B 27/48* (2006.01)

(56) References Cited

U.S. PATENT DOCUMENTS

| | | | |
|---|---|---|---|
| 11,199,765 B2 * | 12/2021 | Pan | G02B 26/008 |
| 2014/0232992 A1 * | 8/2014 | Egawa | G03B 21/208 |
| | | | 353/30 |
| 2021/0294200 A1 * | 9/2021 | Pan | G03B 21/2033 |
| 2021/0356852 A1 * | 11/2021 | Liao | G03B 21/2013 |

FOREIGN PATENT DOCUMENTS

| | | |
|---|---|---|
| CN | 208172483 | 11/2018 |
| CN | 210142255 | 3/2020 |
| JP | 2019061083 | 4/2019 |
| WO | 2018173200 | 9/2018 |

* cited by examiner

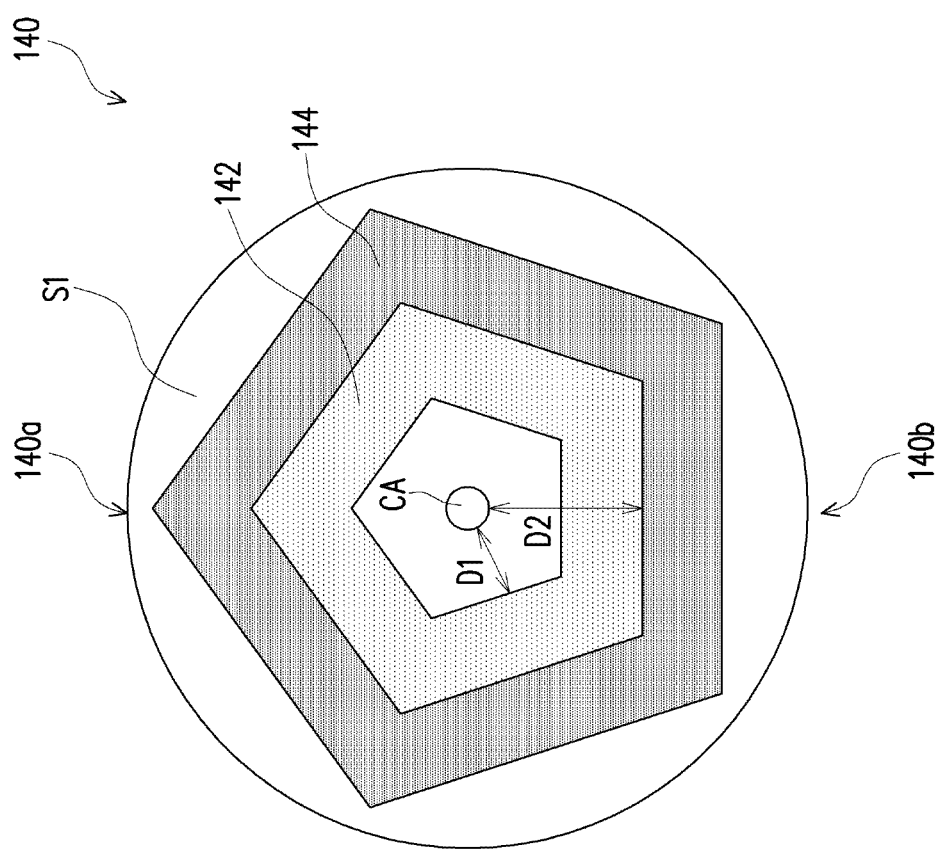

ILLUMINATION SYSTEM AND PROJECTION APPARATUS

CROSS-REFERENCE TO RELATED APPLICATION

This application claims the priority benefit of China application serial no. 202020836073.5, filed on May 19, 2020. The entirety of the above-mentioned patent application is hereby incorporated by reference herein and made a part of this specification.

BACKGROUND

Technical Field

The invention relates to an optical system and an optical apparatus, and particularly relates to an illumination system and a projection apparatus.

Description of Related Art

Along with development of optical technology, solid-state lighting technologies such as light-emitting diodes (LED) and laser diodes (LD) have been more and more widely used in light sources of projectors, where the laser diodes may provide light beams with higher intensities to serve as the light sources of the projectors compared with the LEDs. Therefore, a technique of using an excitation light source to excite phosphor to produce a pure color light source required by the projector is gradually developed. Moreover, in addition to using the excitation light source to excite phosphor, a laser projection apparatus may also directly use an excitation light beam as an illumination light source of the projector, and has an advantage of adjusting a number of light sources according to a brightness requirement, so as to meet the needs of various projectors with different brightness.

Generally, light sources using laser diodes are easy to produce a speckle phenomenon on an image, which will result in degradation of optical imaging quality. In order to mitigate the laser speckle phenomenon, a common way is to arrange a diffusion element at a place where optical paths concentrate. However, if the diffusion degree (haze) of the diffusion element is increased in order to enhance a diffusing effect, an optical coupling efficiency may be reduced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system and a projection apparatus, which are adapted to mitigate a speckle phenomenon of an excitation light beam, and have better optical efficiency.

Other objects and advantages of the invention may be further illustrated by the technical features broadly embodied and described as follows.

In order to achieve one or a portion of or all of the objects or other objects, an embodiment of the invention provides an illumination system configured to provide an illumination light beam, and including a first excitation light source, a second excitation light source and a first diffusion element. The first excitation light source is configured to emit a first excitation light beam, and the second excitation light source is configured to emit a second excitation light beam. The first excitation light beam and the second excitation light beam have different colors. The first diffusion element is disposed on transmission paths of the first excitation light beam and the second excitation light beam. The first diffusion element includes a first diffusion region and a second diffusion region with different diffusion degrees, wherein at least one of the first excitation light beam and the second excitation light beam sequentially passes through the first diffusion region and the second diffusion region, and the illumination light beam includes the first excitation light beam and the second excitation light beam.

In order to achieve one or a portion of or all of the objects or other objects, an embodiment of the invention provides a projection apparatus including the aforementioned illumination system, at least one light valve and a projection lens. The illumination system is configured to provide an illumination light beam. The at least one light valve is disposed on a transmission path of the illumination light beam to modulate the illumination light beam into an image light beam. The projection lens is disposed on a transmission path of the image light beam.

Based on the above descriptions, the embodiments of the invention have at least one of following advantages or effects. In the illumination system and the projection apparatus of the invention, since at least one of a plurality of excitation light beams sequentially passes through the first diffusion region and the second diffusion region of the diffusion element, i.e., passes through the diffusion element twice, the excitation light beam with a relatively severe speckle phenomenon may be arranged to pass through the diffusion element twice to enhance a diffusion effect thereof. The excitation light beam with a slight speckle phenomenon may be arranged to pass through the diffusion element only once to avoid a decrease in optical coupling efficiency. In this way, the speckle phenomenon of the excitation light beam may be effectively mitigated to achieve better optical efficiency.

To make the aforementioned more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3C are schematic front views of a diffusion element of FIG. 2 in different embodiments.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention.

Figure 1:
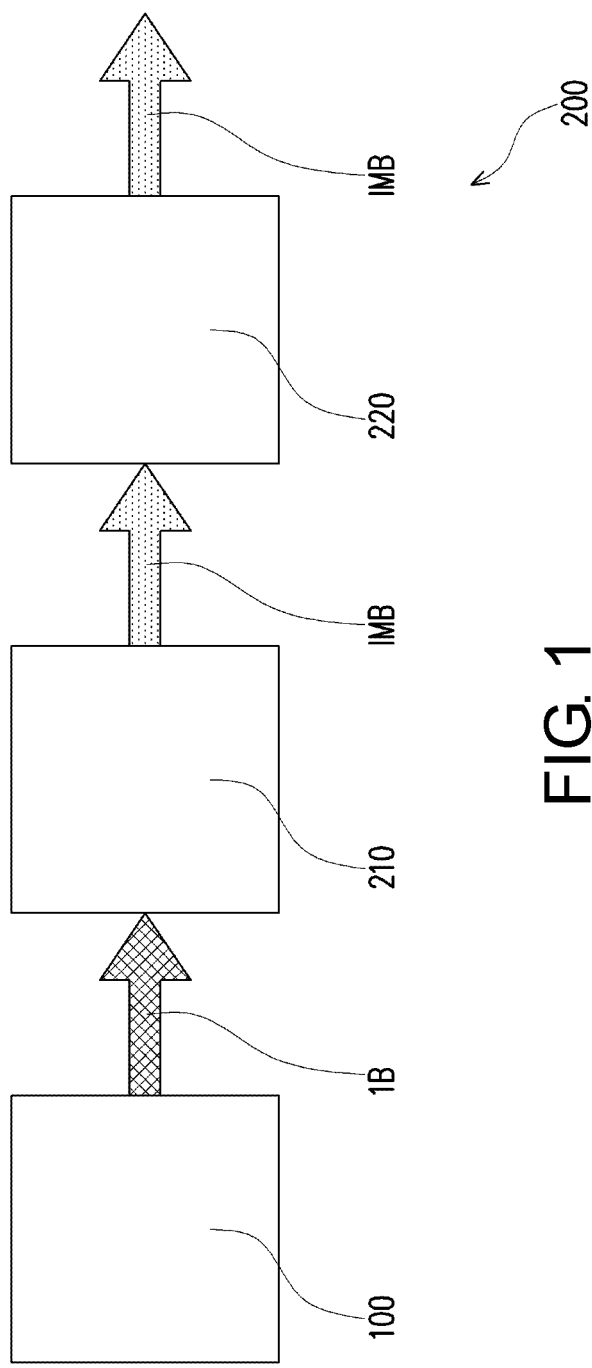
FIG. 1 is a schematic diagram of a projection apparatus according to an embodiment of the invention.

FIG. 1 is a schematic diagram of a projection apparatus according to an embodiment of the invention. Referring to FIG. 1, a projection apparatus 200 of the embodiment includes an illumination system 100, at least one light valve 210, and a projection lens 220. The illumination system 100 is configured to provide an illumination light beam IB. The at least one light valve 210 is disposed on a transmission path of the illumination light beam IB to modulate the illumination light beam IB into an image light beam IMB. The projection lens 220 is disposed on a transmission path of the image light beam IMB, and is configured to project the image light beam IMB out of the projection apparatus 200 on a screen or a wall (not shown) to form an image. Since after the illumination light beam IB of different colors irradiates the at least one light valve 210, the at least one light valve 210 converts the illumination light beam IB of different colors into the image light beam IMB in a time sequence and transmits the image light beam IMB to the projection lens 220, an image formed by the image light beam IMB that is converted by the at least one light valve 210 and projected out of the projection apparatus 200 may be a color image.

In the embodiment, the light valve 210 is, for example, a reflective light modulator such as a digital micro-mirror device (DMD), or a liquid-crystal-on-silicon panel (LCoS panel), etc. However, in other embodiments, the light valve 210 may also be a transmissive light modulator such as a transparent liquid crystal panel, an electro-optical modulator, a magneto-optic modulator, an acousto-optic modulator (AOM), etc. The number, the pattern and the type of the light valve 210 are not limited by the invention.

In the embodiment, the projection lens 220, for example, includes one or a combination of a plurality of optical lenses with refractive powers, and the optical lenses, for example, include non-planar lenses such as a biconcave lens, a biconvex lens, a concavo-convex lens, a convexo-concave lens, a plano-convex lens, a plano-concave lens, etc., or various combinations thereof. The pattern and the type of the projection lens 220 are not limited by the invention.

In the following paragraphs, different implementations of the illumination system 100 of the embodiment are described in detail, where the illumination system 100 may be any one of an illumination system 100a of a first embodiment to an illumination system 100k of an eleventh embodiment.

Figure 2:
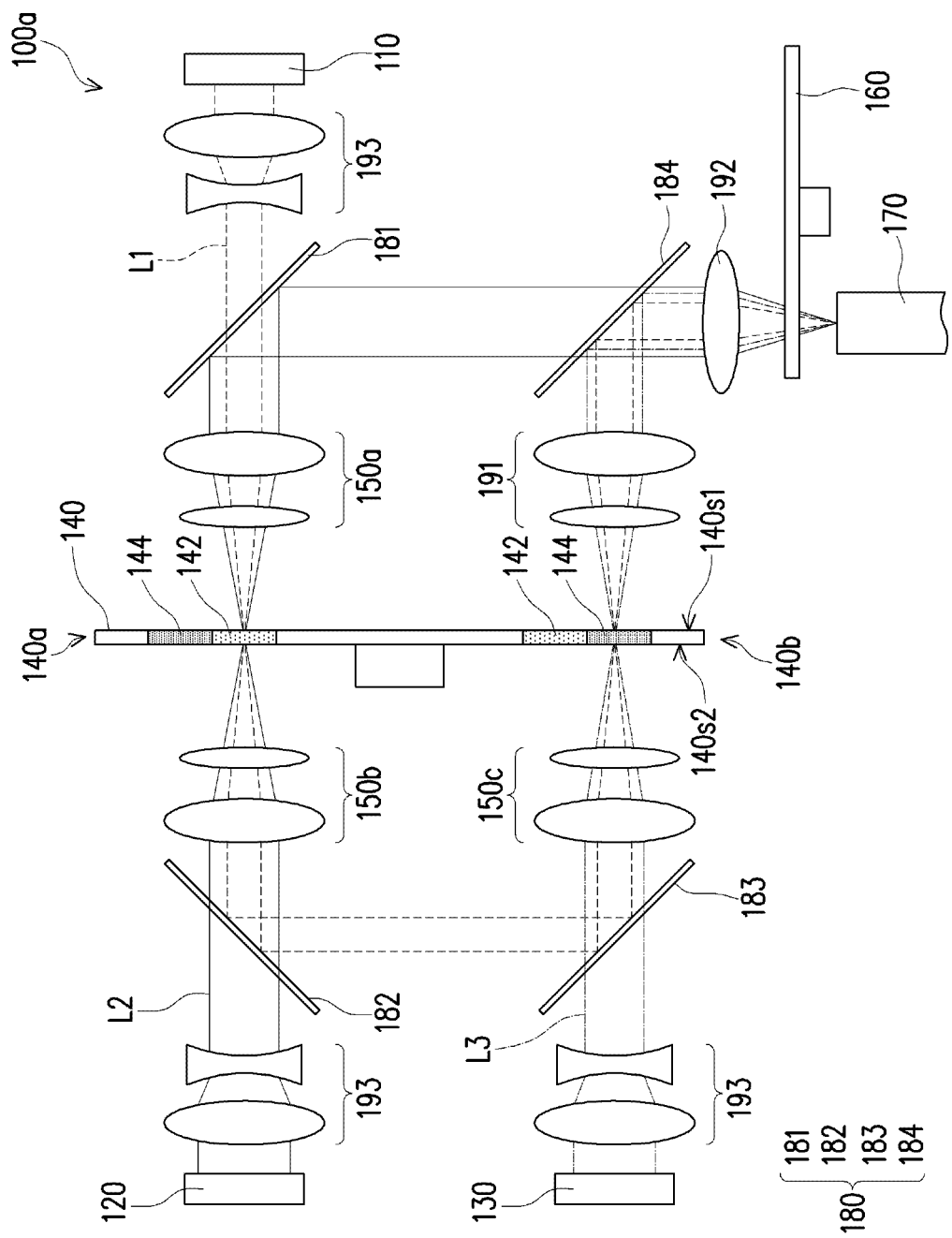
FIG. 2 is a schematic diagram of an illumination system according to a first embodiment of the invention.
Figure 3A:
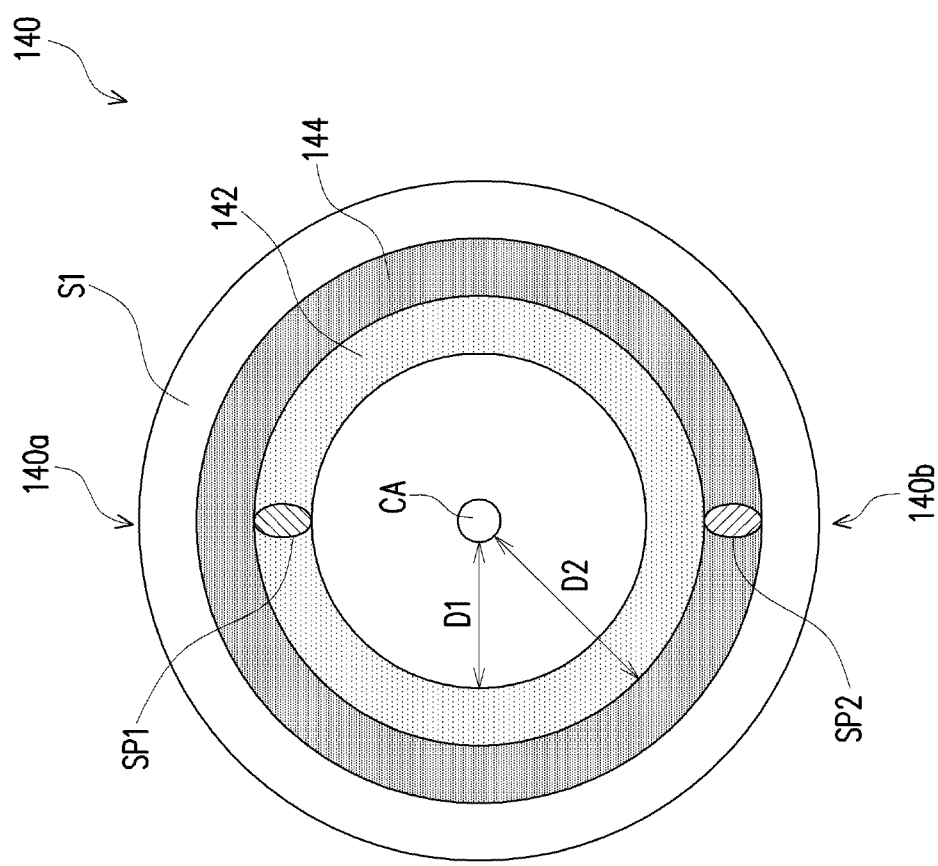
Figure 3B:
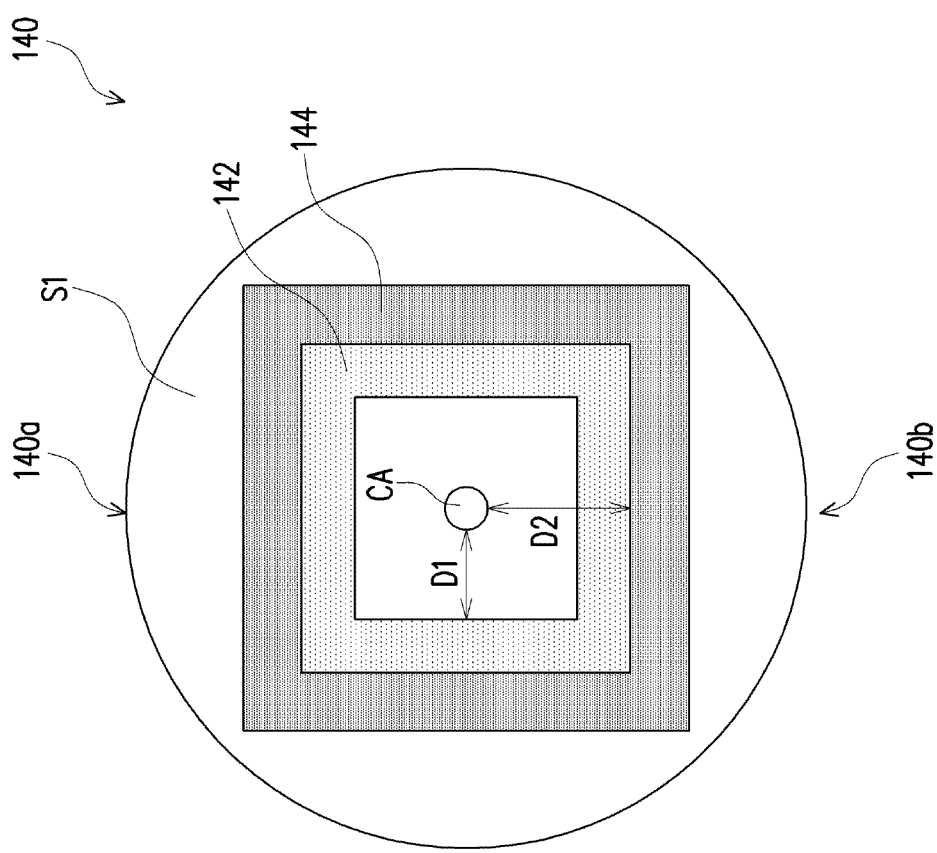

FIG. 2 is a schematic diagram of an illumination system according to the first embodiment of the invention. FIG. 3A to FIG. 3C are schematic front views of a diffusion element of FIG. 2 in different embodiments. Referring to FIG. 2 first, the illumination system 100a includes a first excitation light source 110, a second excitation light source 120, a third excitation light source 130, and a diffusion element 140. The first excitation light source 110, the second excitation light source 120, and the third excitation light source 130 are configured to respectively emit a first excitation light beam L1, a second excitation light beam L2, and a third excitation light beam L3. The first excitation light beam L1, the second excitation light beam L2, and the third excitation light beam L3 respectively have different colors/wavelengths. The diffusion element 140 is disposed on transmission paths of the first excitation light beam L1, the second excitation light beam L2, and the third excitation light beam L3. The diffusion element 140 includes a first diffusion region 142 and a second diffusion region 144 having different diffusion degrees (hazes). At least one of the first excitation light beam L1, the second excitation light beam L2, and the third excitation light beam L3 sequentially passes through the first diffusion region 142 and the second diffusion region 144.

In the embodiment, the first excitation light beam L1 sequentially passes through the first diffusion region 142 and the second diffusion region 144 of the diffusion element 140, the second excitation light beam L2 passes through the first diffusion region 142 of the diffusion element 140, and the third excitation light beam L3 passes through the second diffusion region 144 of the diffusion element 140. Although the illumination system 100a of the embodiment includes three different light sources, in other embodiments, the illumination system may include only two light sources, for example, include only the first excitation light source 110 and the second excitation light source 120, or only the first excitation light source 110 and the third excitation light source 130. Alternatively, the illumination system may include more light sources, which will be discussed in a third to sixth embodiments, an eighth embodiment, and a ninth embodiment below.

In the embodiment, the light source 110, the light source 120, and the light source 130 may include laser diodes (LDs), light-emitting diodes (LEDs), or a bank or a group formed by one of the LDs and LEDs, which is not limited by the invention. In the embodiment, the first excitation light source 110, the second excitation light source 120, and the third excitation light source 130 are laser light-emitting elements including laser diodes. For example, the first excitation light source 110, the second excitation light source 120, and the third excitation light source 130 may respectively include one of a red laser diode bank, a blue laser diode bank, and a green laser diode bank. The first excitation light beam L1, the second excitation light beam L2 and the third excitation light beam L3 respectively include one of a red excitation light beam, a blue excitation light beam and a green excitation light beam, but the invention is not limited thereto.

Referring to FIG. 3A to FIG. 3C, the diffusion element 140 of the embodiment may be a rotating member. The diffusion element 140 includes a substrate S 1, and is adapted to rotate with a central axis CA as a rotation axis. The substrate Si includes the first diffusion region 142 and the second diffusion region 144 arranged in ring shapes, and the first diffusion region 142 and the second diffusion region 144 surround the central axis CA. The first diffusion region 142 and the second diffusion region 144 may be configured with diffusion sheets, diffusion particles, or diffusion structures, for reducing or eliminating the speckle phenomenon of the excitation light beams. As shown in FIG. 3A, the first diffusion region 142 and the second diffusion region 144 may have complete circular ring shapes. As shown in FIG. 3B, the first diffusion region 142 and the second diffusion region 144 may have rectangular ring shapes. As shown in FIG. 3C, the first diffusion region 142 and the second diffusion region 144 may have polygonal ring shapes, such as pentagonal ring shapes, but the invention is not limited thereto.

Since at least one of the excitation light beams (for example, the first excitation light beam L1, the second excitation light beam L2, and the third excitation light beam L3) sequentially passes through the first diffusion region 142 and the second diffusion region 144 of the diffusion element 140, i.e., passes through the diffusion element 140 twice, the excitation light beam with a relatively severe speckle phenomenon may pass through the diffusion element 140 twice to enhance a diffusion effect. The excitation light beam with a slight speckle phenomenon may pass through the diffusion element 140 only once to avoid a decrease in optical coupling efficiency. In this way, the speckle phenomenon of the excitation light beam may be effectively mitigated to achieve better optical efficiency.

For example, when the speckle phenomenon of the first excitation light beam L1 is more severe, and the speckle phenomenon of the second excitation light beam L2 and the third excitation light beam L3 is slight, the first excitation light beam L1 may be arranged to pass through the diffusion element 140 twice, and the second excitation light beam L2 and the third excitation light beam L3 only pass through the diffusion element 140 once.

Moreover, when the speckle phenomenon of the second excitation light beam L2 is more severe than that of the third excitation light beam L3, the diffusion degree (haze) of the first diffusion region 142 where the second excitation light beam L2 passes through may be greater than the diffusion degree (haze) of the second diffusion region 144 where the third excitation light beam L3 passes through, so as to respectively mitigate or eliminate the speckle phenomenon of the second excitation light beam L2 and the third excitation light beam L3. Conversely, when the speckle phenomenon of the second excitation light beam L2 is lighter than that of the third excitation light beam L3, the diffusivity (haze) of the first diffusion region 142 where the second excitation light beam L2 passes through may be smaller than the diffusivity (haze) of the second diffusion region 144 where the third excitation light beam L3 passes through, so as to respectively mitigate or eliminate the speckle phenomenon of the second excitation light beam L2 and the third excitation light beam L3.

As shown in FIG. 3A to FIG. 3C, the first diffusion region 142 and the second diffusion region 144 of the diffusion element 140 are not overlapped. There is a first shortest distance D1 between the first diffusion region 142 and the central axis CA of the diffusion element 140 in a radial direction of the diffusion element 140, and there is a second shortest distance D2 between the second diffusion region 144 and the central axis CA of the diffusion element 140 in the radial direction of the diffusion element 140, and the first shortest distance D1 is different from the second shortest distance D2. In the embodiment, the first diffusion region 142 is located between the second diffusion region 144 and the central axis CA, i.e., the second diffusion region 144 surrounds the first diffusion region 142, so that the first shortest distance D1 is smaller than the second shortest distance D2. In other embodiments, the second diffusion region 144 may be located between the first diffusion region 142 and the central axis CA (not shown), i.e., the first diffusion region 142 surrounds the second diffusion region 144, so that the first shortest distance is greater than the second shortest distance.

As shown in FIG. 2, the first excitation light source 110 and the second excitation light source 120 are respectively located on different sides of the diffusion element 140, the first excitation light source 110 and the third excitation light source 130 are respectively located on different sides of the diffusion element 140, and the second excitation light source 120 and the third excitation light source 130 are located on the same side of the diffusion element 140. In the embodiment, the diffusion element 140 has a first surface $140s1$ and a second surface $140s2$ opposite to each other. The first excitation light beam L1 is incident to the first diffusion region 142 from the first surface $140s1$ of the diffusion element 140 and passes through the first diffusion region 142 to exit from the second surface $140s2$, and is then incident to the second diffusion region 144 from the second surface $140s2$ of the diffusion element 140 and passes through the second diffusion region 144 to exit from the first surface $140s1$. The second excitation light beam L2 is incident to the first diffusion region 142 from the second surface $140s2$ of the diffusion element 140 and passes through the first diffusion region 142 to exit from the first surface $140s1$. The third excitation light beam L3 is incident to the second diffusion region 144 from the second surface $140s2$ of the diffusion element 140 and passes through the second diffusion region 144 to exit from the first surface $140s1$. Namely, the first excitation light beam L1 and the second excitation light beam L2 are respectively incident to the first diffusion region 142 from different surfaces of the diffusion element 140, and the first excitation light beam L1 and the third excitation light beam L3 are incident to the second diffusion region 144 from the same surface (i.e., the second surface $140s2$) of the diffusion element 140.

As shown in FIG. 2 and FIG. 3A, the diffusion element 140 has a first end 140a and a second end 140b on two opposite sides of the central axis CA. The first excitation light beam L1 passes through the first diffusion region 142 from the first end 140a of the diffusion element 140, and passes through the second diffusion region 144 from the second end 140b of the diffusion element 140. The second excitation light beam L2 passes through the first diffusion region 142 from the first end 140a of the diffusion element 140. The third excitation light beam L3 passes through the second diffusion region 144 from the second end 140b of the diffusion element 140. Namely, a light spot SP1 formed by the first excitation light beam L1 and/or the second excitation light beam L2 on the first diffusion region 142 and a light spot SP2 formed by the first excitation light beam L1 and/or the third excitation light beam L3 on the second diffusion region 144 are respectively located on two opposite sides of the central axis CA. In the embodiment, the first end 140a and the second end 140b located on the two opposite sides of the central axis CA refer to the positions on the two opposite sides of the central axis CA serving as a reference line, which represents that after the first excitation light beam L1 passes through the diffusion element 140 from one side of the central axis CA, the first excitation light beam L1 is transmitted back to the other side of the central axis CA of the diffusion element 140 via other optical elements.

Since the first excitation light source 110, the second excitation light source 120, and the third excitation light source 130 may be arranged at different positions, the number of the configured light sources may be more flexible. In addition, the second excitation light beam L2 and the third excitation light beam L3 irradiate at different positions on the diffusion element 140, to make the second excitation light beam L2 and the third excitation light beam L3 to dispersedly irradiate at different positions of the diffusion element 140, an energy density on the diffusion element 140 is reduced to avoid excessive concentration, so as to avoid burning the diffusion element 140, and thus achieve a longer service life.

Referring back to FIG. 2, the illumination system 100a further includes a plurality of focusing lenses, such as a focusing lens 150a, a focusing lens 150b, and a focusing lens 150c. The focusing lens 150a is located on a transmission path of the first excitation light beam L1 and is disposed between the first excitation light source 110 and the diffusion element 140, the focusing lens 150b is located on a transmission path of the second excitation light beam L2 and is disposed between the second excitation light source 120 and the diffusion elements 140, and the focusing lens 150c is located on a transmission path of the third excitation light beam L3 and is disposed between the third excitation light source 130 and the diffusion element 140, where the first diffusion region 142 of the diffusion element 140 is arranged at focal positions of the focusing lens 150a and the focusing lens 150b, and/or the second diffusion region 144 of the diffusion element 140 is arranged at a focal position of the focusing lens 150c. It should be noted that the focusing lens may be a single lens or may be composed of a plurality of lenses, which is not limited by the invention.

In detail, the first excitation light beam L1, the second excitation light beam L2, and the third excitation light beam L3 may be collimated light beams before respectively passing through the focusing lens 150a, the focusing lens 150b, and the focusing lens 150c, so that when the first diffusion region 142 of the diffusion element 140 is disposed at the focal positions of the focusing lens 150a and the focusing lens 150b, and the second diffusion region 144 of the diffusion element 140 is disposed at the focal position of the focusing lens 150c, the first excitation light beam L1, the second excitation light beam L2 and the third excitation light beam L3 may be substantially concentrated on an optical axis when respectively passing through the first diffusion region 142 or the second diffusion region 144, so as to avoid subsequent unexpected changes in a light spot size (for example, light spot expansion).

As shown in FIG. 2, the illumination system 100a further includes a diffusion element 160 and a light uniforming element 170. The diffusion element 160 is disposed on the transmission paths of the first excitation light beam L1, the second excitation light beam L2, and the third excitation light beam L3 from the diffusion element 140, so as to wholly enhance the effect of mitigating the speckle phenomenon. The light uniforming element 170 is disposed on the transmission paths of the first excitation light beam L1, the second excitation light beam L2, and the third excitation light beam L3 from the diffusion element 160, and is configured to uniform the first excitation light beam L1, the second excitation light beam L2, and the third excitation light beam L3 to form the illumination light beam IB for outputting, i.e., the illumination light beam IB includes the first excitation light beam L1, the second excitation light beam L2, and the third excitation light beam L3. In the embodiment, the diffusion degree (haze) of the diffusion element 160 may be smaller than the diffusion degrees (hazes) of the first diffusion region 142 and the second diffusion region 144 of the diffusion element 140. In other embodiments, the diffusion element 160 may be omitted, or a color filter element with a diffusion function may be used to replace the diffusion element 160. The light uniforming element 170 refers to an optical element capable of uniforming the light beams passing through the light uniforming element 170. In the embodiment, the light uniforming element 170 is, for example, an integration rod. In other embodiments, the light uniforming element 170 may be a lens array or other optical elements with the light uniforming effect.

Moreover, the illumination system 100a may further include a light transmitting module 180. The light transmitting module 180 includes a light combining element 181, a light combining element 182, a light combining element 183, and a light combining element 184. The light combining element 181 is disposed on the transmission paths of the first excitation light beam L1 and the second excitation light beam L2 and is located between the first excitation light source 110 and the diffusion element 140. The light combining element 182 is disposed on the transmission paths of the first excitation light beam L1 and the second excitation light beam L2 and is located between the second excitation light source 120 and the diffusion element 140. The light combining element 183 is disposed on the transmission paths of the first excitation light beam L1 and the third excitation light beam L3 and is located between the third excitation light source 130 and the diffusion element 140. The light combining element 184 is disposed on the transmission paths of the first excitation light beam L1 and the third excitation light beam L3 from the light combining element 183 and the second excitation light beam L2 from the light combining element 181, and is disposed between the light combining element 181 and the light uniforming element 170.

To be specific, the light combining element 181, the light combining element 182, the light combining element 183 and the light combining element 184 may be dichroic units, such as dichroic mirrors (DM) or dichroic prisms, and may provide different optical effects on light beams of different colors/wavelengths. In the embodiment, the light combining element 181 may be designed to be pervious to the first excitation light beam L1 and reflect the second excitation light beam L2 to transmit the first excitation light beam L1 from the first excitation light source 110 to the first diffusion region 142 of the diffusion element 140, and reflect the second excitation light beam L2 from the first diffusion region 142 of the diffusion element 140 to the light combining element 184. The light combining element 182 may be designed to be pervious to the second excitation light beam L2 and reflect the first excitation light beam L1 to transmit the second excitation light beam L2 from the second excitation light source 120 to the first diffusion region 142 of the diffusion element 140, and reflect the first excitation light beam L1 from the first diffusion region 142 of the diffusion element 140 to the light combining element 183. The light combining element 183 may be designed to be pervious to the third excitation light beam L3 and reflect the first excitation light beam L1 to combine and transmit the third excitation light beam L3 from the third excitation light source 130 and the first excitation light beam L1 reflected by the light combining element 182 to the second diffusion region 144 of the diffusion element 140. The light combining element 184 may be designed to be pervious to the second excitation light beam L2 and reflect the first excitation light beam L1 and the third excitation light beam L3, so as to combine and transmit the second excitation light beam L2 from the light combining element 181 and the first excitation light beam L1 and the third excitation light beam L3 from the second diffusion region 144 of the diffusion element 140 to the light uniforming element 170.

Moreover, the illumination system 100a may further include other optical elements to adjust the light beams or their optical paths inside the illumination system 100a. For example, the illumination system 100a may include a collimating lens 191, a focusing lens 192, and a plurality of lens groups 193. The collimating lens 191 is disposed on the transmission paths of the first excitation light beam L1 and the third excitation light beam L3 from the diffusion element 140 and is disposed between the diffusion element 140 and the light combining element 184. The focusing lens 192 is disposed on the transmission paths of the first excitation light beam L1, the second excitation light beam L2, and the third excitation light beam L3 and is located between the light combining element 184 and the diffusion element 160. The lens groups 193 are respectively located between the first excitation light source 110 and the light combining element 181, between the second excitation light source 120 and the light combining element 182, and between the third excitation light source 130 and the light combining element 183, to respectively adjust beam diameters of the first excitation light beam L1, the second excitation light beam L2, and the third excitation light beam L3.

It should be noticed that a part of contents of the aforementioned embodiment are also used in the following embodiment, where descriptions of the same technical contents are omitted, and a part of the aforementioned embodiment may be referred for description of the same reference numbers, and detailed descriptions thereof are not repeated in the following embodiment. Moreover, in the following embodiments, the lens groups 193 are omitted.

Figure 4:
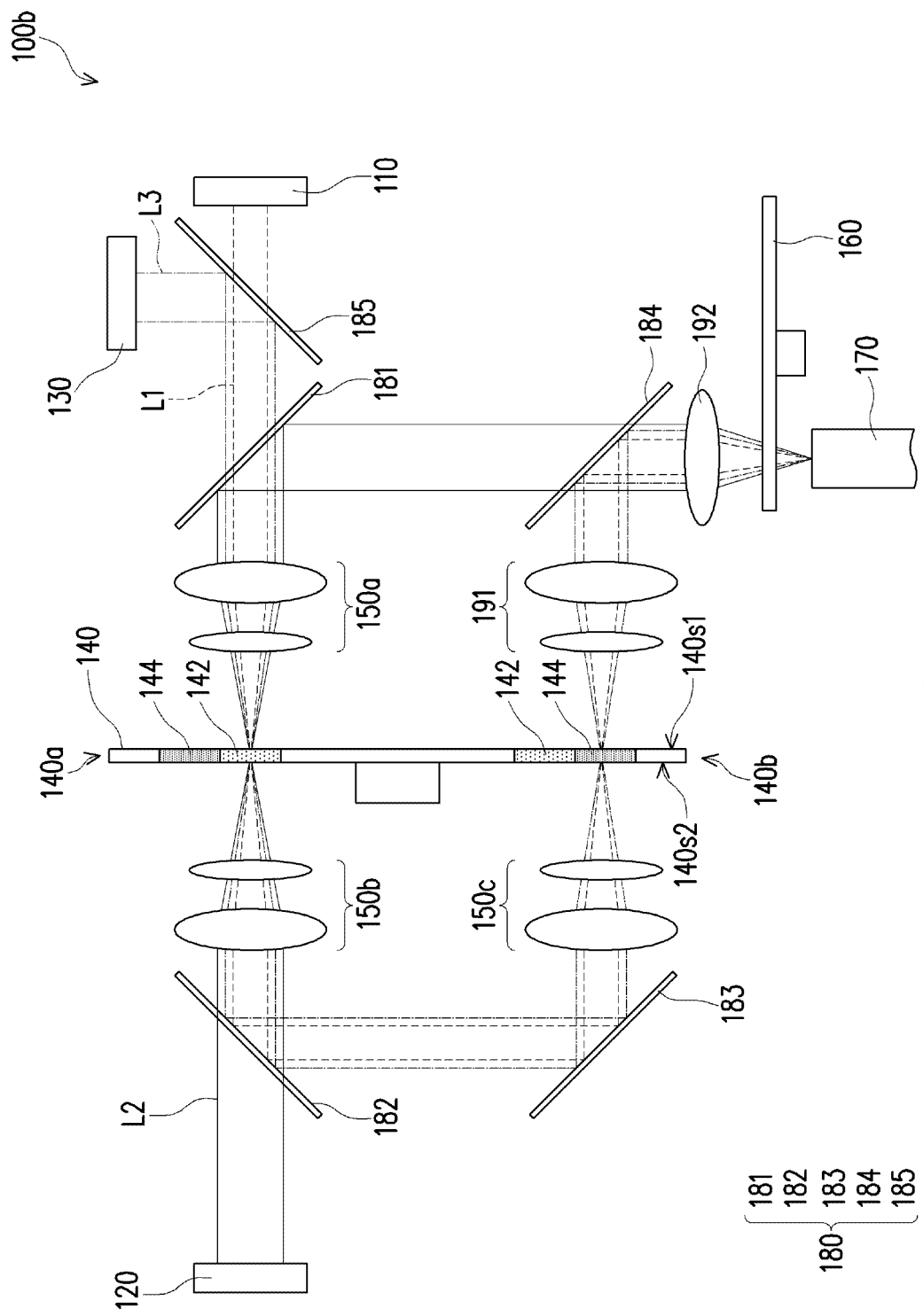
FIG. 4 is a schematic diagram of an illumination system according to a second embodiment of the invention.

FIG. 4 is a schematic diagram of an illumination system according to a second embodiment of the invention. Referring to FIG. 4, an illumination system 100b of the embodiment is similar to the illumination system 100a of the first embodiment, and a main difference there between in framework lies in an arrangement position of the third excitation light source 130 and the transmission path of the third excitation light beam L3 emitted by the third excitation light source 130. The illumination system 100b of the embodiment further includes a light combining element 185. The light combining element 185 is disposed on the transmission paths of the first excitation light beam L1 and the third excitation light beam L3 and is located between the first excitation light source 110 and the light combining element 181, and is configured to combine the first excitation light beam L1 and the third excitation light beam L3. The first excitation light source 110 and the third excitation light source 130 are disposed on two opposite sides of the light combining element 185, and the third excitation light beam L3 emitted by the third excitation light source 130 may be combined with the first excitation light beam L1 emitted by the first excitation light source 110 through the light combining element 185 and transmitted to the light combining element 181.

When the speckle phenomenon of the first excitation light beam L1 and the third excitation light beam L3 is relatively severe, and the speckle phenomenon of the second excitation light beam L2 is slight, the first excitation light beam L1 and the third excitation light beam L3 may be arranged to pass through the diffusion element 140 twice, and the second excitation light beam L2 passes through the diffusion element 140 only once. In the embodiment, the first excitation light beam L1 and the third excitation light beam L3 sequentially pass through the first diffusion region 142 and the second diffusion region 144 of the diffusion element 140, and the second excitation light beam L2 passes through the first diffusion region 142 of the diffusion element 140.

The light combining element 185 of the embodiment may also be a dichroic unit, such as a dichroic mirror (DM) or a dichroic prism, and may provide different optical effects on light beams of different colors/wavelengths. In the embodiment, the light combining element 185 may be designed to be pervious to the first excitation light beam L1 and reflect the third excitation light beam L3 to combine and transmit the first excitation light beam L1 from the first excitation light source 110 and the third excitation light beam L3 from the third excitation light source 130 to the light combining element 181. The light combining element 181 may be designed to be pervious to the first excitation light beam L1 and the third excitation light beam L3 and reflect the second excitation light beam L2, and the light combining element 182, the light combining element 183 and the light combining element 184 may be designed to reflect the third excitation light beam L3. Therefore, the light combining element 181 may transmit the first excitation light beam L1 and the third excitation light beam L3 from the light combining element 185 to the first diffusion region 142 of the diffusion element 140, the light combining element 182 and the light combining element 183 may sequentially transmit the first excitation light beam L1 and the third excitation light beam L3 from the first diffusion region 142 of the diffusion element 140 to the second diffusion region 144 of the diffusion element 140, and the light combining element 184 may transmit the first excitation light beam L1 and the third excitation light beam L3 from the second diffusion region 144 of the diffusion element 140 to the light uniforming element 170. In some embodiments, the light combining element 183 may also be replaced by a reflection mirror.

As shown in FIG. 4, the first excitation light source 110 and the third excitation light source 130 are located on the same side of the diffusion element 140, and the second excitation light source 120 and the third excitation light source 130 are respectively located on the different sides of the diffusion element 140. In the embodiment, the third excitation light beam L3 is incident to the first diffusion region 142 from the first surface 140s1 of the diffusion element 140 and passes through the first diffusion region 142 to exit from the second surface 140s2, and is then incident to the second diffusion region 144 from the second surface 140s2 of the diffusion element 140 and passes through the second diffusion region 144 to exit from the first surface 140s1. Namely, the first excitation light beam L1 and the third excitation light beam L3 are incident to the first diffusion region 142 from the same surface (i.e., the first surface 140s1) of the diffusion element 140, and are incident to the second diffusion region 144 from the same surface (i.e., the second surface 140s2) of the diffusion element 140. The third excitation light beam L3 and the second excitation light beam L2 are respectively incident to the first diffusion region 142 from different surfaces of the diffusion element 140.

As shown in FIG. 4 and FIG. 3A, the first excitation light beam L1 and the third excitation light beam L3 pass through the first diffusion region 142 from the first end 140a of the diffusion element 140, and pass through the second diffusion region 144 from the second end 140b of the diffusion element 140. Namely, the light spot SP1 formed by the first excitation light beam L1, the second excitation light beam L2, and the third excitation light beam L3 on the first diffusion region 142, and the light spot SP2 formed by the first excitation light beam L1 and the third excitation light beam L3 on the second diffusion region 144 are respectively located at two opposite sides of the central axis CA.

Figure 5:
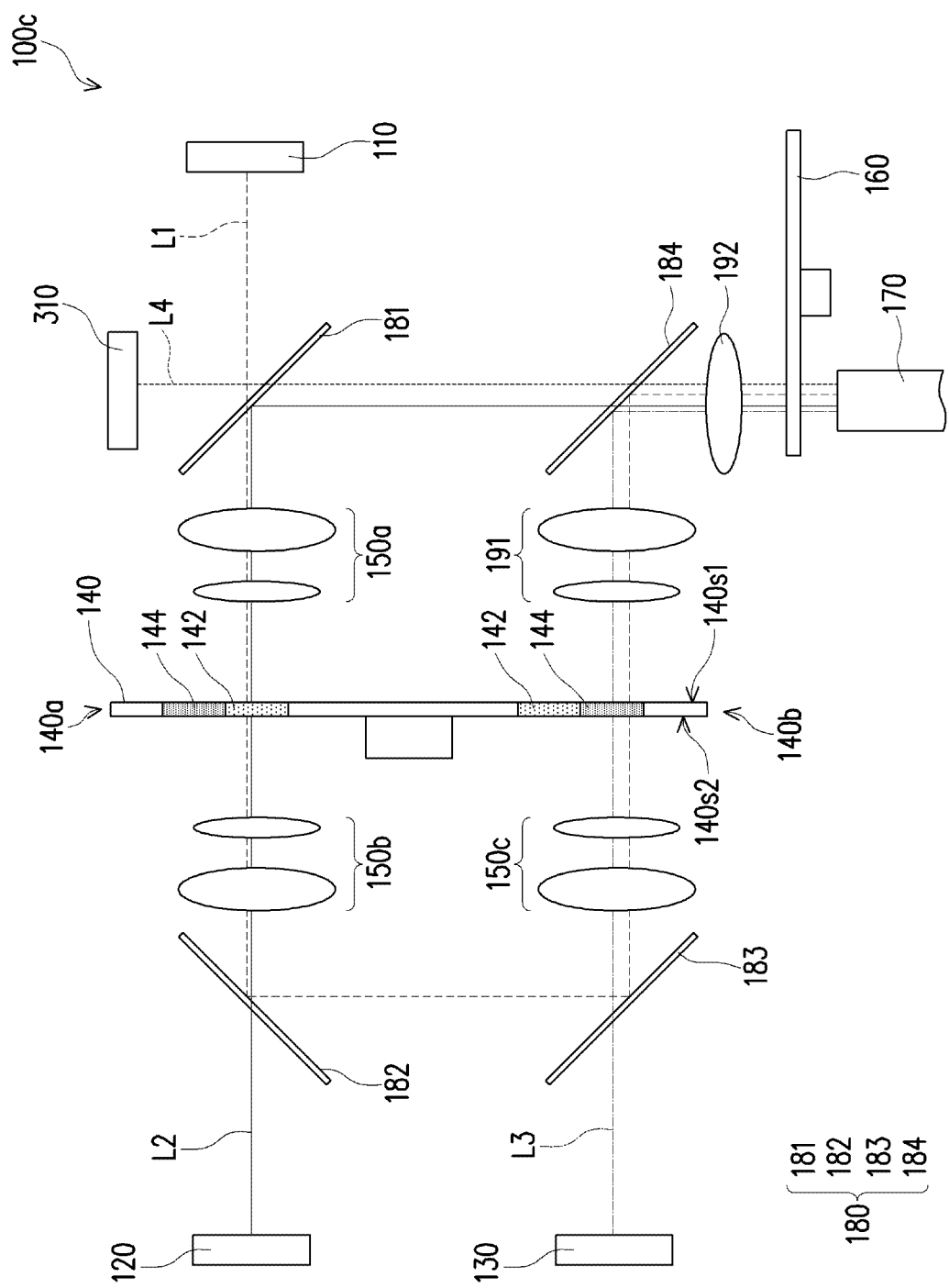
FIG. 5 is a schematic diagram of an illumination system according to a third embodiment of the invention.

FIG. 5 is a schematic diagram of an illumination system according to a third embodiment of the invention. Referring to FIG. 5, an illumination system 100c of the embodiment is similar to the illumination system 100a of the first embodiment, and a main difference there between in framework lies in the number of light sources. For clarity's sake, each beam path in FIG. 5 to FIG. 8 is represented by a single line only. The illumination system 100c of the embodiment further includes an excitation light source 310. The excitation light source 310 is configured to emit an excitation light beam L4. In the embodiment, the excitation light beam L4 has a color/wavelength different from that of the first excitation light beam L1, the second excitation light beam L2, and the third excitation light beam L3. For example, the excitation light source 310 may include an infrared laser diode bank, a yellow laser diode bank, a cyan laser diode bank, or a magenta laser diode bank, and the excitation light beam L4 includes an infrared excitation light beam, a yellow excitation light beam, a cyan excitation light beam, or a magenta excitation light beam, but the invention is not limited thereto.

In the embodiment, the excitation light source 310 is, for example, an infrared laser diode bank, and the excitation light beam L4 is, for example, an infrared excitation light beam. The excitation light beam L4 emitted from the excitation light source 310 sequentially passes through the light combining element 181 and the light combining element 184 and is transmitted to the diffusion element 160. When the speckle phenomenon of the excitation light beam L4 is lighter than that of the first excitation light beam L1, the second excitation light beam L2, and the third excitation light beam L3, the excitation light beam L4 may not pass through the diffusion element 140 but only pass through the diffusion element 160 to enter the light uniforming element 170.

In the embodiment, the light combining element 181 may be designed to be pervious to the excitation light beam L4 and the first excitation light beam L1 and reflect the second excitation light beam L2, and the light combining element 184 may be designed to be pervious to the excitation light beam L4 and the second excitation light beam L2 and reflect the first excitation light beam L1 and the third excitation light beam L3, so as to transmit the first excitation light beam L1, the second excitation light beam L2, the third excitation light beam L3, and the excitation light beam L4 from the excitation light source 310 to the light uniforming element 170.

Figure 6:
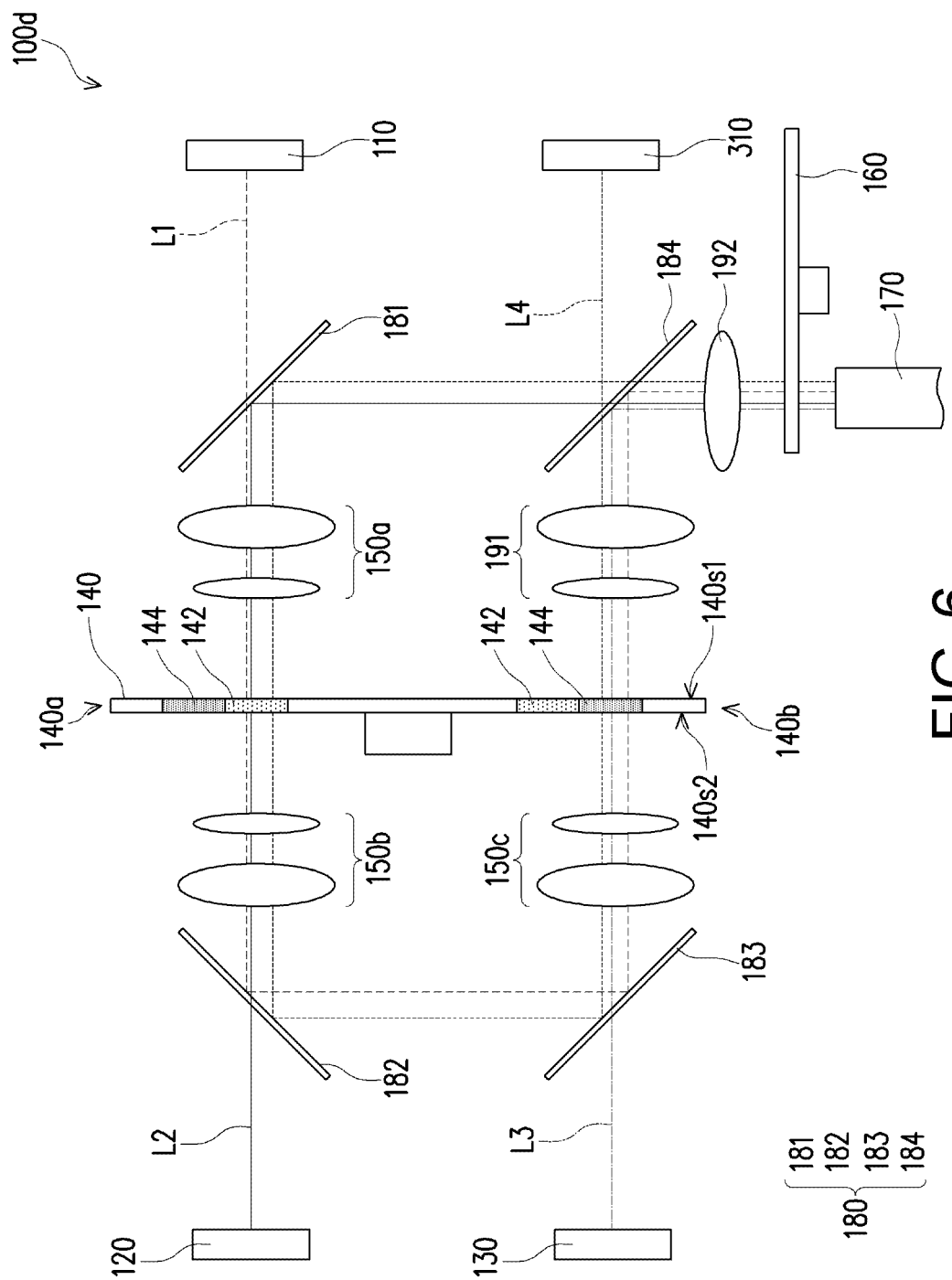
FIG. 6 is a schematic diagram of an illumination system according to a fourth embodiment of the invention.

FIG. 6 is a schematic diagram of an illumination system according to a fourth embodiment of the invention. Referring to FIG. 6, an illumination system 100d of the embodiment is similar to the illumination system 100a of the first embodiment, and a main difference there between in framework lies in the number of light sources. The illumination system 100d of the embodiment further includes the excitation light source 310. The excitation light source 310 is configured to emit the excitation light beam L4. In the embodiment, the excitation light beam L4 has a color/wavelength different from that of the first excitation light beam L1, the second excitation light beam L2, and the third excitation light beam L3. For example, the excitation light source 310 may include an infrared laser diode bank, a yellow laser diode bank, a cyan laser diode bank, or a magenta laser diode bank, and the excitation light beam L4 includes an infrared excitation light beam, a yellow excitation light beam, a cyan excitation light beam, or a magenta excitation light beam, but the invention is not limited thereto.

In the embodiment, the excitation light source 310 is, for example, an infrared laser diode bank, and the excitation light beam L4 is, for example, an infrared excitation light beam. When the speckle phenomenon of the first excitation light beam L1 and the excitation light beam L4 is relatively severe, and the speckle phenomenon of the second excitation light beam L2 and the third excitation light beam L3 is lighter, the first excitation light beam L1 and the excitation light beam L4 may be arranged to pass through the diffusion element 140 twice, while the second excitation light beam L2 and the third excitation light beam L3 only pass through the diffusion element 140 once. In the embodiment, the first excitation light beam L1 sequentially passes through the first diffusion region 142 and the second diffusion region 144 of the diffusion element 140, the second excitation light beam L2 passes through the first diffusion region 142 of the diffusion element 140, the third excitation light beam L3 passes through the second diffusion region 144 of the diffusion element 140, and the excitation light beam L4 sequentially passes through the second diffusion region 144 and the first diffusion region 142 of the diffusion element 140.

In the embodiment, the light combining element 181, the light combining element 182, and the light combining element 183 may be designed to reflect the excitation light beam L4, and the light combining element 184 may be designed to be pervious to the excitation light beam L4 and the second excitation light beam L2. Therefore, the excitation light beam L4 from the light source 310 passes through the light combining element 184 and is transmitted to the second diffusion region 144 of the diffusion element 140. The light combining element 183 and the light combining element 182 may sequentially reflect and transmit the excitation light beam L4 from the second diffusion region 144 of the diffusion element 140 to the first diffusion region 142 of the diffusion element 140, and the light combining element 181 reflects the excitation light beam L4 from the first diffusion region 142 of the diffusion element 140, and the excitation light beam L4 passes through the light combining element 184 and is transmitted to the light uniforming element 170.

As shown in FIG. 6, the first excitation light source 110 and the excitation light source 310 are located on the same side of the diffusion element 140. The second excitation light source 120 and the excitation light source 310 are respectively located on the different sides of the diffusion element 140. The third excitation light source 130 and the excitation light source 310 are respectively located on the different sides of the diffusion element 140. In the embodiment, the excitation light beam L4 is incident to the second diffusion region 144 from the first surface 140s1 of the diffusion element 140 and passes through the second diffusion region 144 to exit from the second surface 140s2, and is then incident to the first diffusion region 142 from the second surface 140s2 of the diffusion element 140 and passes through the first diffusion region 142 to exit from the first surface 140s1. Namely, the first excitation light beam L1 and the excitation light beam L4 are respectively incident to the first diffusion region 142 and the second diffusion region 144 from the same surface (i.e., the first surface 140s1) of the diffusion element 140, the third excitation light beam L3 and the excitation light beam L4 are respectively incident to the second diffusion region 144 from different surfaces of the diffusion element 140, and the second excitation light beam L2 and the excitation light beam L4 are incident to the first diffusion region 142 from the same surface (i.e. the second surface 140s2) of the diffusion element 140.

As shown in FIG. 6 and FIG. 3A, the excitation light beam L4 passes through the second diffusion region 144 from the second end 140b of the diffusion element 140, and passes through the first diffusion region 142 from the first end 140a of the diffusion element 140. Namely, the light spot SP1 formed by the first excitation light beam L1, the second excitation light beam L2, and the excitation light beam L4 on the first diffusion region 142, and the light spot SP2 formed by the first excitation light beam L1, the third excitation light beam L3 and the excitation light beam L4 on the second diffusion region 144 are respectively located at two opposite sides of the central axis CA.

Figure 7:
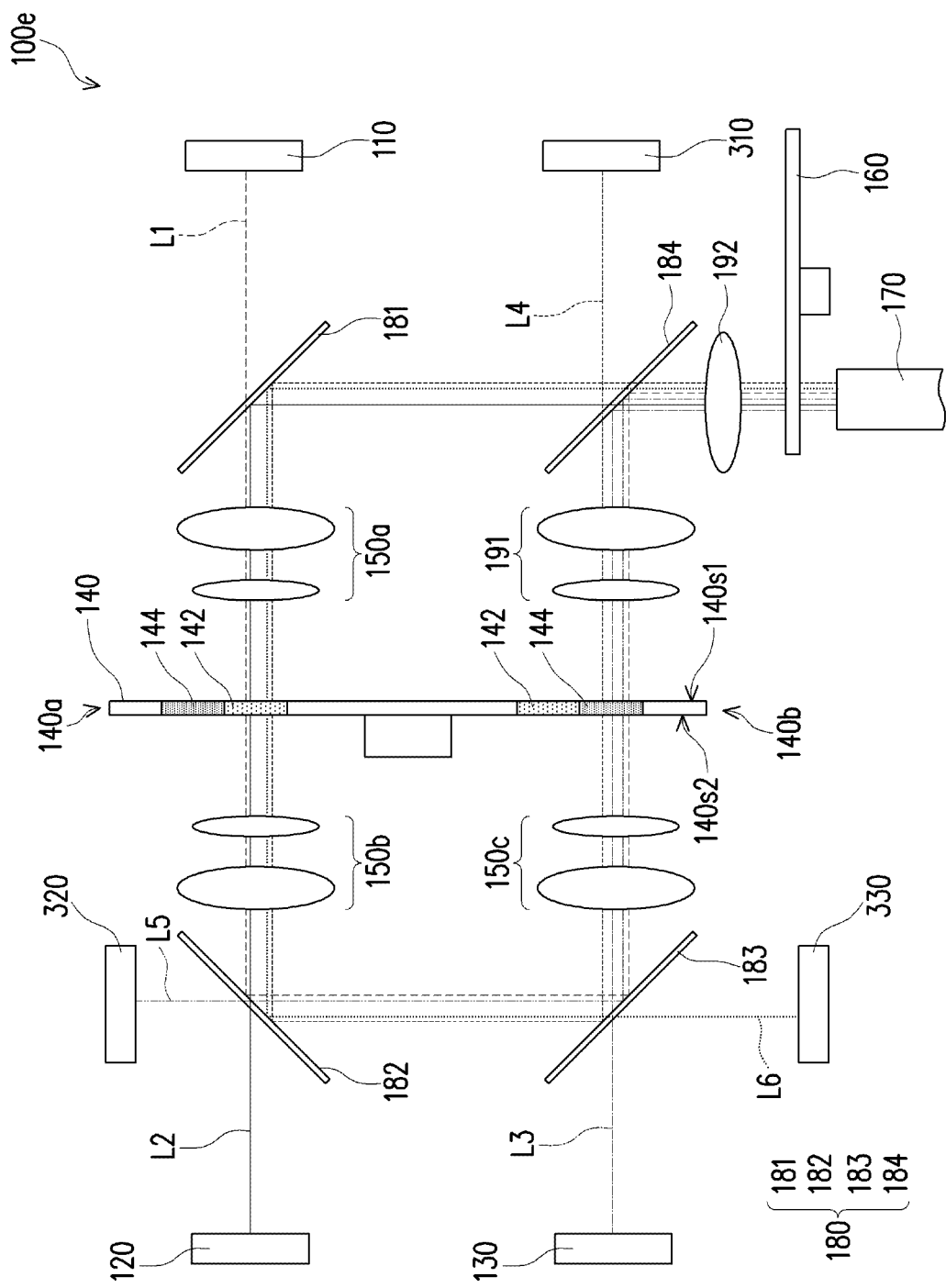
FIG. 7 is a schematic diagram of an illumination system according to a fifth embodiment of the invention.

FIG. 7 is a schematic diagram of an illumination system according to a fifth embodiment of the invention. Referring to FIG. 7, an illumination system 100e of the embodiment is similar to the illumination system 100d of the fourth embodiment, and a main difference there between in framework lies in the number of light sources. The illumination system 100e of the embodiment further includes an excitation light source 320 and an excitation light source 330. The excitation light source 320 is configured to emit an excitation light beam L5, and the excitation light source 330 is configured to emit an excitation light beam L6. The excitation light beam L5 and the excitation light beam L6 have colors/wavelengths different from that of the first excitation light beam L1, the second excitation light beam L2, the third excitation light beam L3 and the excitation light beam L4, and the excitation light beam L5 and the excitation light beam L6 also have different colors/wavelengths. For example, the excitation light source 320 and the excitation light source 330 may respectively include an infrared laser diode bank, a yellow laser diode bank, a cyan laser diode bank, or a magenta laser diode bank, and the excitation light beam L5 and the excitation light beam L6 respectively include an infrared excitation light beam, a yellow excitation light beam, a cyan excitation light beam, or a magenta excitation light beam, but the invention is not limited thereto.

When the speckle phenomenon of the first excitation light beam L1 and the excitation light beam L4 is relatively severe, and the speckle phenomenon of the second excitation light beam L2, the third excitation light beam L3, the excitation light beam L5 and the excitation light beam L6 is lighter, the first excitation light beam L1 and the excitation light beam L4 may be arranged to pass through the diffusion element 140 twice, while the second excitation light beam L2, the third excitation light beam L3, the excitation light beam L5 and the excitation light beam L6 only pass through the diffusion element 140 once. In the embodiment, the first excitation light beam L1 sequentially passes through the first diffusion region 142 and the second diffusion region 144 of the diffusion element 140, the second excitation light beam L2 and the excitation light beam L6 pass through the first diffusion region 142 of the diffusion element 140, the third excitation light beam L3 and the excitation light beam L5 pass through the second diffusion region 144 of the diffusion element 140, and the excitation light beam L4 sequentially passes through the second diffusion region 144 and the first diffusion region 142 of the diffusion element 140.

Moreover, when the speckle phenomenon of the second excitation light beam L2 and the excitation light beam L6 is more severe than that of the third excitation light beam L3 and the excitation light beam L5, the diffusivity (haze) of the first diffusion region 142 where the second excitation light beam L2 and the excitation light beam L6 pass through may be greater than the diffusivity (haze) of the second diffusion region 144 where the third excitation light beam L3 and the excitation light beam L5 pass through, so as to respectively mitigate or eliminate the speckle phenomenon of the second excitation light beam L2 and the excitation light beam L6 and the speckle phenomenon of the third excitation light beam L3 and the excitation light beam L5. Conversely, when the speckle phenomenon of the second excitation light beam L2 and the excitation light beam L6 is lighter than that of the third excitation light beam L3 and the excitation light beam L5, the diffusivity (haze) of the first diffusion region 142 where the second excitation light beam L2 and the excitation light beam L6 pass through may be smaller than the diffusivity (haze) of the second diffusion region 144 where the third excitation light beam L3 and the excitation light beam L5 pass through, so as to respectively mitigate or eliminate the speckle phenomenon of the second excitation light beam L2 and the excitation light beam L6 and the speckle phenomenon of the third excitation light beam L3 and the excitation light beam L5.

In the embodiment, the light combining element 182 may be designed to be pervious to the second excitation light beam L2 and the excitation light beam L5 and reflect the first excitation light beam L1, the excitation light beam L4 and the excitation light beam L6. The light combining element 183 may be designed to be pervious to the third excitation light beam L3 and the excitation light beam L6 and reflect the first excitation light beam L1, the excitation light beam L4 and the excitation light beam L5. The light combining element 181 may be designed to be pervious to the first excitation light beam L1 and reflect the second excitation light beam L2, the excitation light beam L4 and the excitation light beam L6. The light combining element 184 may be designed to be pervious to the second excitation light beam L2, the excitation light beam L4, and the excitation light beam L6 and reflect the first excitation light beam L1, the third excitation light beam L3, and the excitation light beam L5. Therefore, the light combining element 182 and the light combining element 183 may sequentially transmit the excitation light beam L5 from the excitation light source 320 to the second diffusion region 144 of the diffusion element 140, and the light combining element 184 may transmit the excitation light beam L5 from the second diffusion region 144 of the diffusion element 140 to the light uniforming element 170. The light combining element 183 and the light combining element 182 may sequentially transmit the excitation light beam L6 from the excitation light source 330 to the first diffusion region 142 of the diffusion element 140, and the light combining element 181 and the light combining element 184 may sequentially transmit the excitation light beam L6 from the first diffusion region 142 of the diffusion element 140 to the light uniforming element 170.

As shown in FIG. 7, the second excitation light source 120, the third excitation light source 130, the excitation light source 320 and the excitation light source 330 are located on the same side of the diffusion element 140. The excitation light source 320 and the first excitation light source 110 are respectively located on the different sides of the diffusion element 140. The excitation light source 330 and the excitation light source 310 are respectively located on the different sides of the diffusion element 140. In the embodiment, the excitation light beam L5 is incident to the second diffusion region 144 from the second surface 140s2 of the diffusion element 140 and passes through the second diffusion region 144 to exit from the first surface 140s1, the excitation light beam L6 is incident to the first diffusion region 142 from the second surface 140s2 of the diffusion element 140 and passes through the first diffusion region 144 to exit from the first surface 140s1. Namely, the first excitation light beam L1 and the excitation light beam L6 are respectively incident to the first diffusion region 142 from different surfaces of the diffusion element 140, and the first excitation light beam L1 and the excitation light beam L5 are respectively incident to the second diffusion region 144 from the same surface (i.e., the second surface 140s2) of the diffusion element 140, and pass through the second diffusion region 144 to exit from the first surface 140s1. The excitation light beam L4 and the excitation light beam L5 are respectively incident to the second diffusion region 144 from different surfaces of the diffusion element 140, and the excitation light beam L4 and the excitation light beam L6 are incident to the first diffusion region 142 from the same surface (i.e., the second surface 140s2) of the diffusion element 140, and pass through the first diffusion region 142 to exit from the first surface 140s1.

As shown in FIG. 7 and FIG. 3A, the excitation light beam L5 passes through the second diffusion region 144 from the second end 140b of the diffusion element 140, and the excitation light beam L6 passes through the first diffusion region 142 from the first end 140a of the diffusion element 140. Namely, the light spot SP1 formed by the first excitation light beam L1, the second excitation light beam L2, and the excitation light beam L6 on the first diffusion region 142, and the light spot SP2 formed by the first excitation light beam L1, the third excitation light beam L3, the excitation light beam L4 and the excitation light beam L5 on the second diffusion region 144 are respectively located at two opposite sides of the central axis CA.

Figure 8:
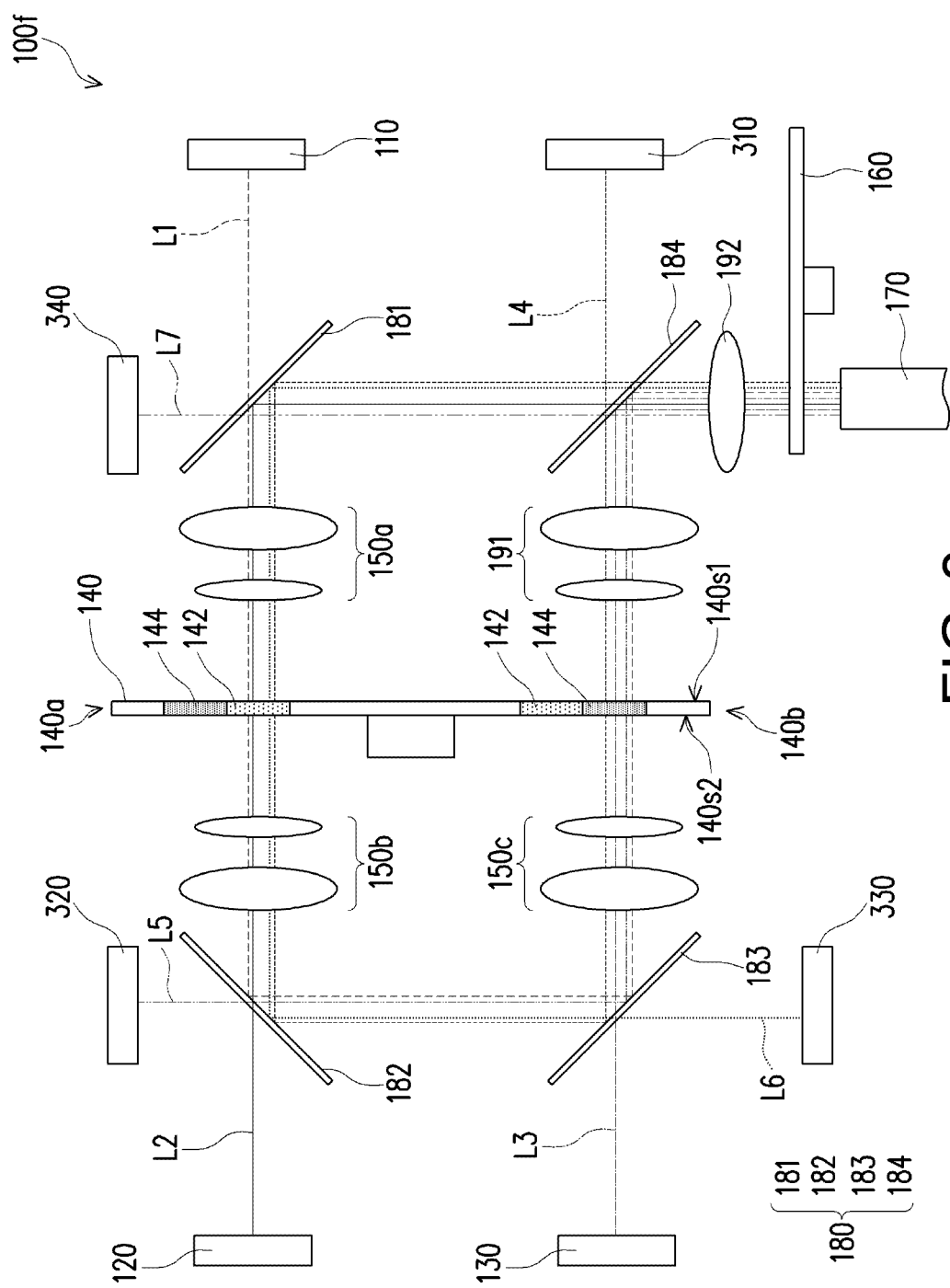
FIG. 8 is a schematic diagram of an illumination system according to a sixth embodiment of the invention.

FIG. 8 is a schematic diagram of an illumination system according to a sixth embodiment of the invention. Referring to FIG. 8, an illumination system 100f of the embodiment is similar to the illumination system 100e of the fifth embodiment, and a main difference there between in framework lies in the number of light sources. The illumination system 100f of the embodiment further includes an excitation light source 340. The excitation light source 340 is configured to emit an excitation light beam L7. In the embodiment, the excitation light beam L7 has a color/wavelength different from that of the first excitation light beam L1 to the excitation light beam L6. The excitation light source 340 and a transmission path of the excitation light beam L7 may be substantially similar to the excitation light source 310 and the transmission path of the excitation light beam L4 of the illumination system 100c of the third embodiment, and for related descriptions, reference may be made to the aforementioned third embodiment, which is not repeated.

Figure 9:
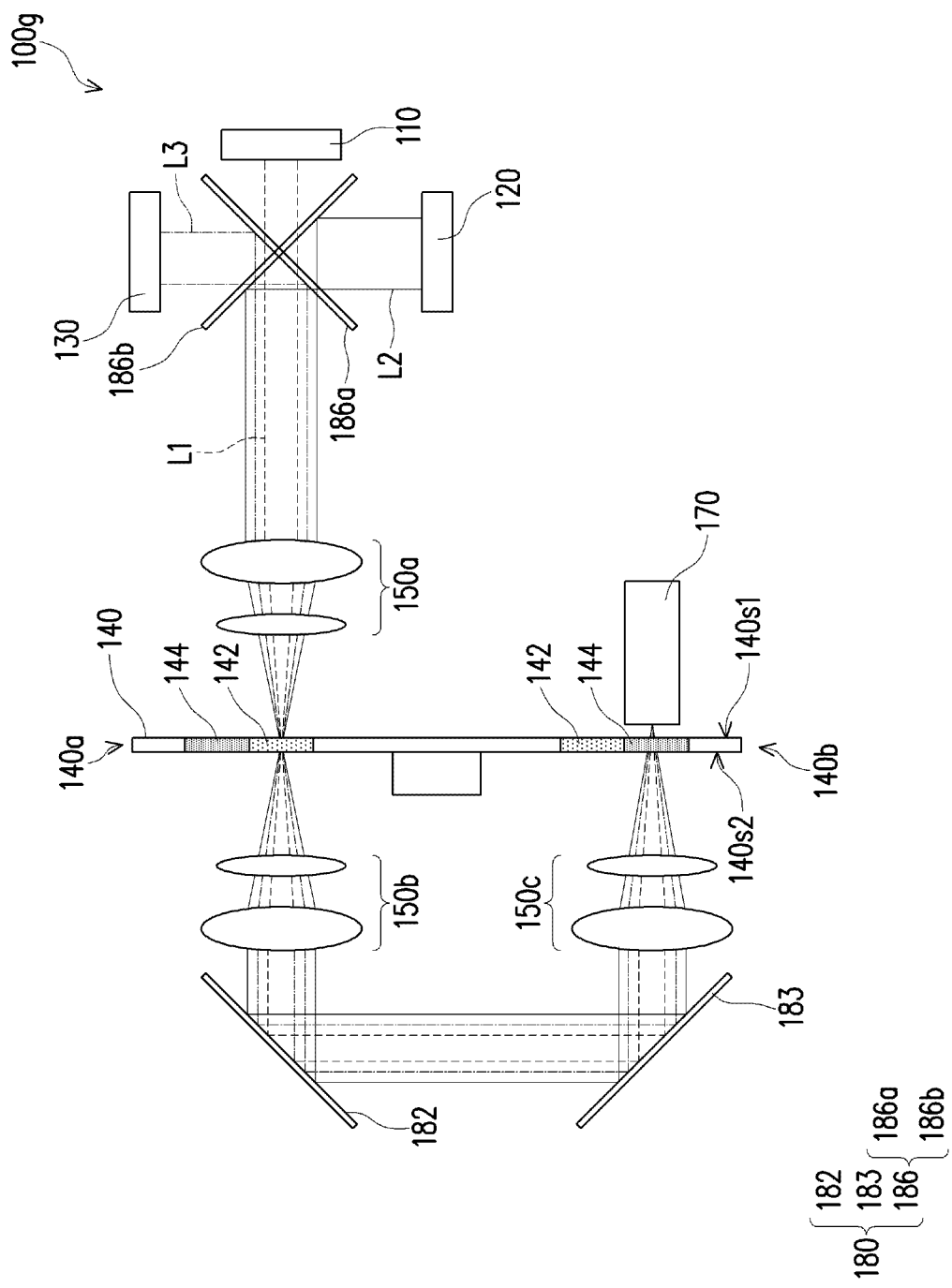
FIG. 9 is a schematic diagram of an illumination system according to a seventh embodiment of the invention.

FIG. 9 is a schematic diagram of an illumination system according to a seventh embodiment of the invention. Referring to FIG. 9, an illumination system 100g of the embodiment is similar to the illumination system 100a of the first embodiment, and a main difference there between in framework lies in configuration positions of the second excitation light source 120 and the third excitation light source 130 and the transmission paths of the second excitation light beam L2 emitted by the second excitation light source 120 and the third excitation light beam L3 emitted by the third excitation light source 130. The illumination system 100g of the embodiment includes a light combining module 186. The light combining module 186 is disposed on the transmission paths of the first excitation light beam L1, the second excitation light beam L2 and the third excitation light beam L3, and is configured to combine the first excitation light beam L1, the second excitation light beam L2 and the third excitation light beam L3. To be specific, in the embodiment, the light combining module 186 may include a dichroic mirror (DM) 186a and a dichroic mirror 186b, and may provide different optical effects on excitation light beams of different colors/wavelengths. For example, in the embodiment, the dichroic mirror 186a may be designed to be pervious to the first excitation light beam L1 and the second excitation light beam L2 and reflect the third excitation light beam L3, and the dichroic mirror 186b may be designed to be pervious to the first excitation light beam L1 and the third excitation light beam L3 and reflect the second excitation light beam L2. Therefore, the light combining module 186 may combine and transmit the first excitation light beam L1, the second excitation light beam L2, and the third excitation light beam L3 respectively from the first excitation light source 110, the second excitation light source 120, and the third excitation light source 130 to the first diffusion region 142 of the diffusion element 140. In addition, in other embodiments, the light combining module 186 may also be a dichroic prism group.

In the embodiment, the first excitation light beam L1, the second excitation light beam L2, and the third excitation light beam L3 sequentially pass through the first diffusion region 142 and the second diffusion region 144 of the diffusion element 140. Namely, the first excitation light beam L1, the second excitation light beam L2, and the third excitation light beam L3 pass through the diffusion element 140 twice.

In the embodiment, the illumination system 100g may not include the light combining element 181, the light combining element 184, the collimating lens 191, the focusing lens 192, and the diffusion element 160 of the illumination system 100a. The light uniforming element 170 is disposed on one side of the second diffusion region 144 of the diffusion element 140.

In the embodiment, the light combining element 182 and the light combining element 183 may be designed to reflect the first excitation light beam L1, the second excitation light beam L2, and the third excitation light beam L3. Therefore, the light combining element 182 and the light combining element 183 may sequentially transmit the first excitation light beam L1, the second excitation light beam L2, and the third excitation light beam L3 from the first diffusion region 142 of the diffusion element 140 to the second diffusion region 144 of the diffusion element 140 and the light uniforming element 170. In some embodiments, the light combining element 182 and the light combining element 183 may also be replaced by reflection mirrors.

As shown in FIG. 9, the first excitation light source 110, the second excitation light source 120, and the third excitation light source 130 are all located on the same side of the diffusion element 140. In the embodiment, the first excitation light beam L1, the second excitation light beam L2, and the third excitation light beam L3 are all incident to the first diffusion region 142 from the first surface 140s1 of the diffusion element 140 and exit from the second surface 140s2, and are then incident to the second diffusion region 144 from the second surface 140s2 of the diffusion element 140 and exit from the first surface 140s1. Namely, the first excitation light beam L1, the second excitation light beam L2, and the third excitation light beam L3 are all incident to the first diffusion region 142 from the same surface (i.e., the first surface 140s1) of the diffusion element 140, and are all incident to the second diffusion region 144 from the same surface (i.e., the second surface 140s2) of the diffusion element 140.

As shown in FIG. 9 and FIG. 3A, the first excitation light beam L1, the second excitation light beam L2, and the third excitation light beam L3 all pass through the first diffusion region 142 from the first end 140a of the diffusion element 140, and all pass through the second diffusion region 144 from the second end 140b of the diffusion element 140. Namely, the light spot SP1 formed by the first excitation light beam L1, the second excitation light beam L2, and the third excitation light beam L3 on the first diffusion region 142, and the light spot SP2 formed by the first excitation light beam L1, the second excitation light beam L2, and the third excitation light beam L3 on the second diffusion region 144 are respectively located at two opposite sides of the central axis CA.

Figure 10:
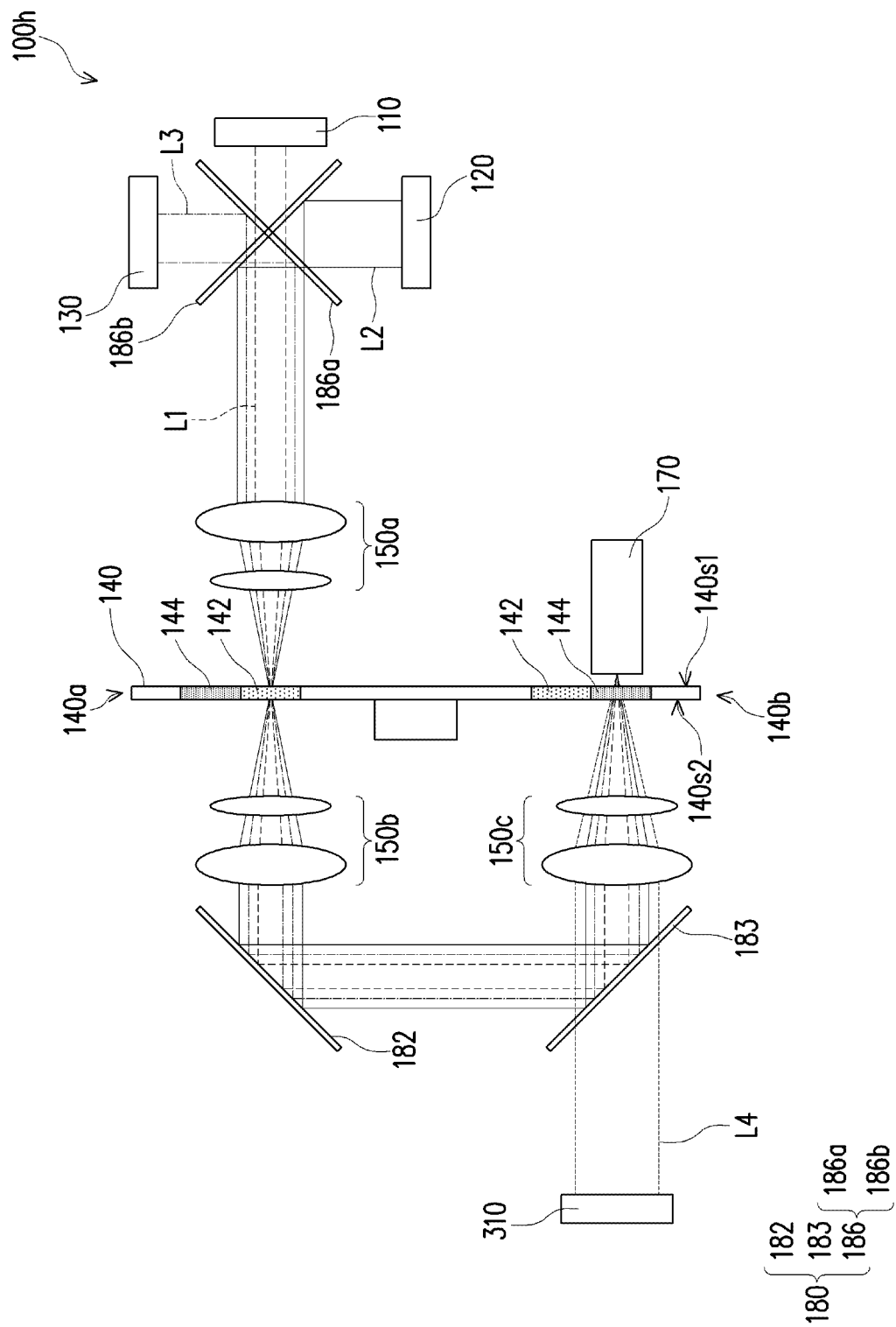
FIG. 10 is a schematic diagram of an illumination system according to an eighth embodiment of the invention.

FIG. 10 is a schematic diagram of an illumination system according to an eighth embodiment of the invention. Referring to FIG. 10, an illumination system 100h of the embodiment is similar to the illumination system 100g of the seventh embodiment, and a main difference there between in framework lies in the number of light sources. The illumination system 100h of the embodiment further includes the excitation light source 310. The excitation light source 310 is configured to emit the excitation light beam L4. In the embodiment, the excitation light beam L4 has a color/wavelength different from that of the first excitation light beam L1, the second excitation light beam L2, and the third excitation light beam L3. For example, the excitation light source 310 may include an infrared laser diode bank, a yellow laser diode bank, a cyan laser diode bank, or a magenta laser diode bank, and the excitation light beam L4 includes an infrared excitation light beam, a yellow excitation light beam, a cyan excitation light beam, or a magenta excitation light beam, but the invention is not limited thereto.

When the speckle phenomenon of the excitation light beam L4 is lighter than that of the first excitation light beam L1, the second excitation light beam L2, and the third excitation light beam L3, the excitation light beam L4 may only pass through the diffusion element 140 once. In the embodiment, the excitation light source 310 is, for example, an infrared laser diode bank, and the excitation light beam L4 is, for example, an infrared excitation light beam, and the excitation light beam L4 only passes through the second diffusion region 144 of the diffusion element 140.

In the embodiment, the light combining element 183 may be designed to be pervious to the excitation light beam L4, so as to transmit the excitation light beam L4 from the excitation light source 310 to the second diffusion region 144 of the diffusion element 140.

As shown in FIG. 10, the first excitation light source 110 (or the second excitation light source 120/the third excitation light source 130) and the excitation light source 310 are located on different sides of the diffusion element 140. In the embodiment, the excitation light beam L4 is incident to the second diffusion region 144 from the second surface 140s2 of the diffusion element 140. Namely, the first excitation light beam L1 to the excitation light beam L4 are all incident to the second diffusion region 144 from the same surface (i.e., the second surface 140s2) of the diffusion element 140.

As shown in FIG. 10 and FIG. 3A, the excitation light beam L4 passes through the second diffusion region 144 from the second end 140b of the diffusion element 140. Namely, the light spot SP1 formed by the first excitation light beam L1, the second excitation light beam L2, and the third excitation light beam L3 on the first diffusion region 142, and the light spot SP2 formed by the first excitation light beam L1 to the excitation light beam L4 on the second diffusion region 144 are respectively located at two opposite sides of the central axis CA.

Figure 11:
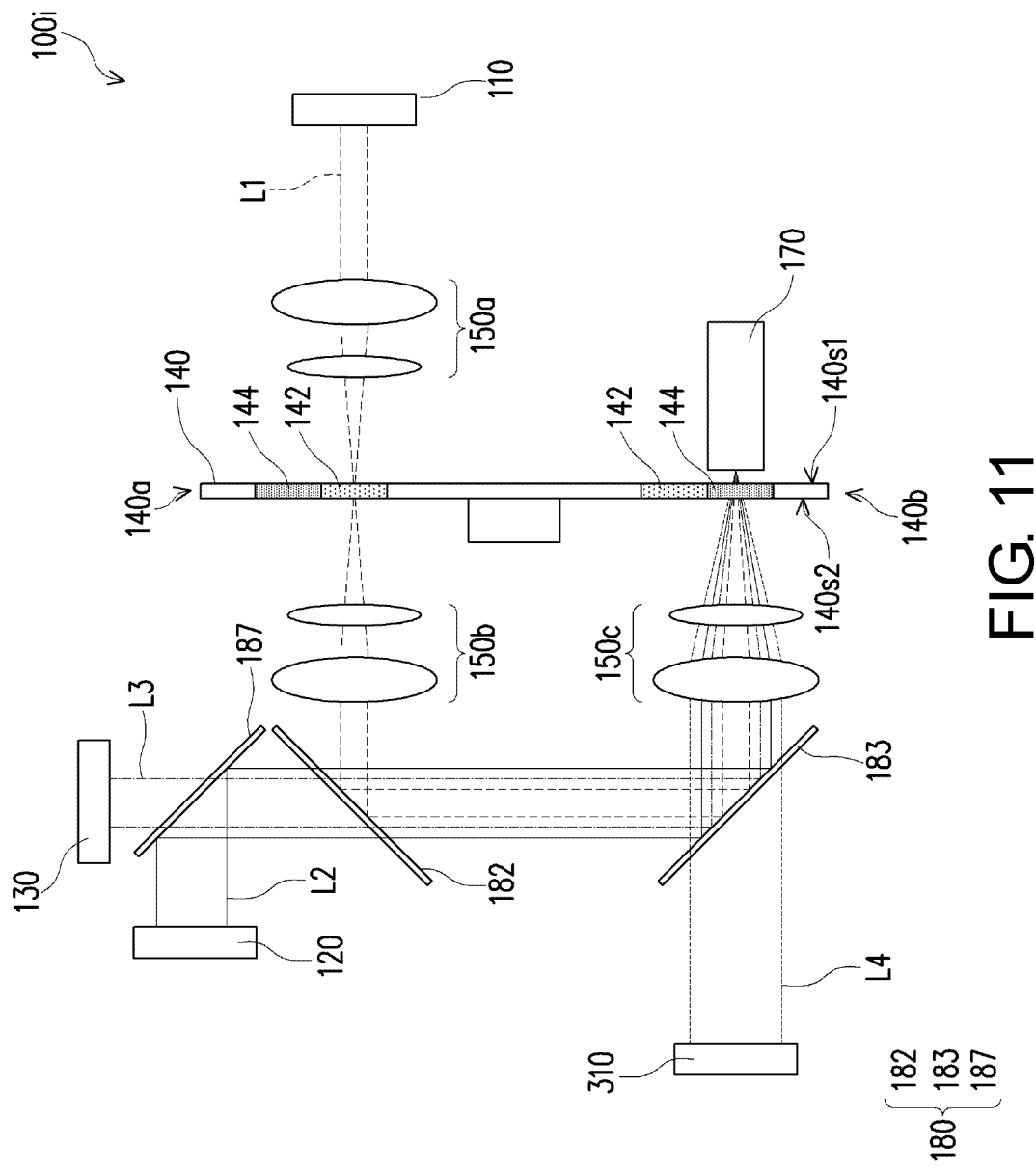
FIG. 11 is a schematic diagram of an illumination system according to a ninth embodiment of the invention.

FIG. 11 is a schematic diagram of an illumination system according to a ninth embodiment of the invention. Referring to FIG. 11, an illumination system 100i of the embodiment is similar to the illumination system 100h of the eighth embodiment, and a main difference there between in framework lies in configuration positions of the second excitation light source 120 and the third excitation light source 130 and the transmission paths of the second excitation light beam L2 emitted by the second excitation light source 120 and the third excitation light beam L3 emitted by the third excitation light source 130. The illumination system 100i of the embodiment includes a light combining module 187. The light combining module 187 is disposed on the transmission paths of the second excitation light beam L2 and the third excitation light beam L3, and is configured to combine the second excitation light beam L2 and the third excitation light beam L3. The second excitation light source 120 and the third excitation light source 130 are disposed on two opposite sides of the light combining element 187, and the third excitation light beam L3 emitted by the third excitation light source 130 may be combined with the second excitation light beam L2 emitted by the second excitation light source 120 through the light combining element 187 and transmitted to the light combining element 182.

When the speckle phenomenon of the second excitation light beam L2 and the third excitation light beam L3 is lighter than that of the first excitation light beam L1, the second excitation light beam L2 and the third excitation light beam L3 may be arranged to only pass through the diffusion element 140 once. In the embodiment, the second excitation light beam L2 and the third excitation light beam L3 only pass through the second diffusion region 144 of the diffusion element 140 to enter the light uniforming element 170.

In the embodiment, the illumination system 100i may not include the light combining module 186 of the illumination system 100h.

In the embodiment, the light combining element 182 may be designed to be pervious to the second excitation light beam L2 and the third excitation light beam L3 to transmit the second excitation light beam L2 and the third excitation light beam L3 from the light combining element 187 to the light combining element 183. The light combining element 183 may be designed to reflect the second excitation light beam L2 and the third excitation light beam L3 to transmit the second excitation light beam L2 and the third excitation light beam L3 from the light combining element 182 to the second diffusion region 144 of the diffusion element 140 and the light uniforming element 170.

As shown in FIG. 11, the first excitation light source 110 and the second excitation light source 120 are respectively located on different sides of the diffusion element 140, and the first excitation light source 110 and the third excitation light source 130 are respectively located on different sides of the diffusion element 140. In the embodiment, the second excitation light beam L2 and the third excitation light beam L3 are incident to the second diffusion region 144 from the second surface 140s2 of the diffusion element 140 and pass through the second diffusion region 144 to exist from the first surface 140s1. Namely, the first excitation light beam L1 to the excitation light beam L4 are all incident to the second diffusion region 144 from the same surface (i.e., the second surface 140s2) of the diffusion element 140.

As shown in FIG. 11 and FIG. 3A, the second excitation light beam L2 and the third excitation light beam L3 pass through the second diffusion region 144 from the second end 140b of the diffusion element 140. Namely, the light spot SP1 formed by the first excitation light beam L1 on the first diffusion region 142, and the light spot SP2 formed by the first excitation light beam L1 to the excitation light beam L4 on the second diffusion region 144 are respectively located at two opposite sides of the central axis CA.

Figure 12:
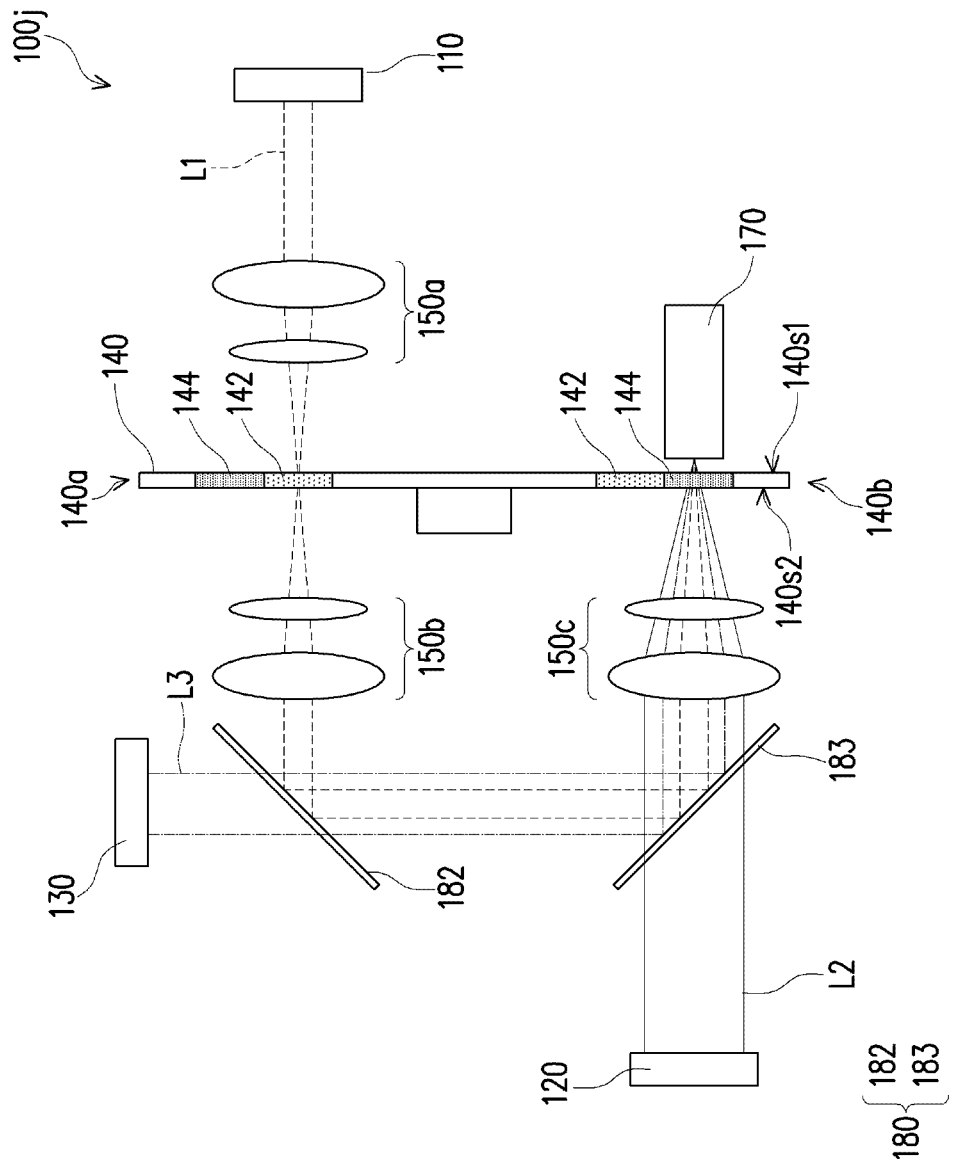
FIG. 12 is a schematic diagram of an illumination system according to a tenth embodiment of the invention.

FIG. 12 is a schematic diagram of an illumination system according to a tenth embodiment of the invention. Referring to FIG. 12, an illumination system 100j of the embodiment is similar to the illumination system 100g of the seventh embodiment, and a main difference there between in framework lies in configuration positions of the second excitation light source 120 and the third excitation light source 130 and the transmission paths of the second excitation light beam L2 emitted by the second excitation light source 120 and the third excitation light beam L3 emitted by the third excitation light source 130.

When the speckle phenomenon of the second excitation light beam L2 and the third excitation light beam L3 is lighter than that of the first excitation light beam L1, the second excitation light beam L2 and the third excitation light beam L3 may be arranged to only pass through the diffusion element 140 once. In the embodiment, the second excitation light beam L2 and the third excitation light beam L3 only pass through the second diffusion region 144 of the diffusion element 140.

In the embodiment, the illumination system 100j may not include the light combining module 186 of the illumination system 100g.

In the embodiment, the light combining element 182 may be designed to be pervious to the third excitation light beam L3 to transmit the third excitation light beam L3 from the third excitation light source 130 to the light combining element 183. The light combining element 183 may be designed to be pervious to the second excitation light beam L2 and reflect the third excitation light beam L3 to combine and transmit the second excitation light beam L2 from the second excitation light source 120 and the third excitation light beam L3 from the light combining element 182 to the second diffusion region 144 of the diffusion element 140 and the light uniforming element 170.

As shown in FIG. 12, the first excitation light source 110 and the second excitation light source 120 are respectively located on different sides of the diffusion element 140, and the first excitation light source 110 and the third excitation light source 130 are respectively located on different sides of the diffusion element 140. In the embodiment, the second excitation light beam L2 and the third excitation light beam L3 are incident to the second diffusion region 144 from the second surface 140s2 of the diffusion element 140 and pass through the second diffusion region 144 to exist from the first surface 140s1. Namely, the first excitation light beam L1 to the third excitation light beam L3 are all incident to the second diffusion region 144 from the same surface (i.e., the second surface 140s2) of the diffusion element 140.

As shown in FIG. 12 and FIG. 3A, the second excitation light beam L2 and the third excitation light beam L3 pass through the second diffusion region 144 from the second end 140b of the diffusion element 140. Namely, the light spot SP1 formed by the first excitation light beam L1 on the first diffusion region 142, and the light spot SP2 formed by the first excitation light beam L1, the second excitation light beam L2 and the third excitation light beam L3 on the second diffusion region 144 are respectively located at two opposite sides of the central axis CA.

Figure 13:
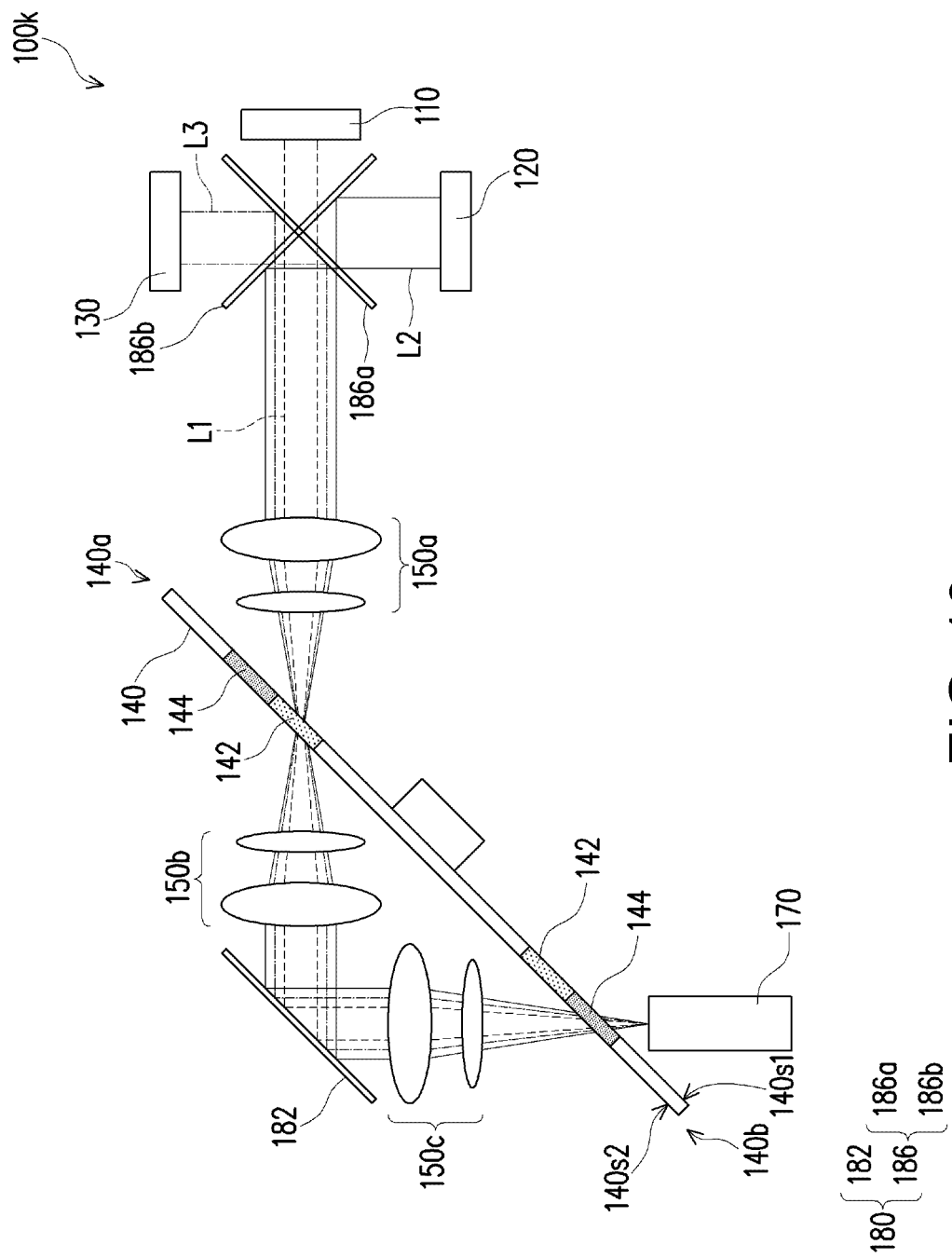
FIG. 13 is a schematic diagram of an illumination system according to an eleventh embodiment of the invention.

FIG. 13 is a schematic diagram of an illumination system according to an eleventh embodiment of the invention. Referring to FIG. 13, an illumination system 100k of the embodiment is similar to the illumination system 100g of the seventh embodiment, and a main difference there between in framework lies in an incident angle of each excitation light beam with respect to the diffusion element 140. In the first to tenth embodiments, each excitation light beam (for example, any one of the first excitation light beam L1 to the excitation light beam L7) is perpendicularly incident to the diffusion element 140. In the embodiment, each excitation light beam (for example, any one of the first excitation light beam L1 to the third excitation light beam L3) is obliquely incident to the diffusion element 140. For example, each excitation light beam (for example, any one of the first excitation light beam L1 to the third excitation light beam L3) is obliquely incident to the first diffusion region 142 at an angle of 45 degrees with respect to the diffusion element 140 and is reflected by the light combining element 182 and passes through the second diffusion region 144 to enter the light uniforming element 170.

In the embodiment, the illumination system 100k may not include the light combining element 183 of the illumination system 100g. Therefore, the illumination system 100k may have a smaller volume.

In summary, in the illumination system and the projection apparatus of the invention, since at least one of a plurality of excitation light beams sequentially passes through the first diffusion region and the second diffusion region of the diffusion element, i.e., passes through the diffusion element twice, the excitation light beam with a relatively severe speckle phenomenon may be arranged to pass through the diffusion element twice to enhance a diffusion effect thereof. The excitation light beam with a slight speckle phenomenon may be arranged to pass through the diffusion element only once to avoid a decrease in optical coupling efficiency. In this way, the speckle phenomenon of the excitation light beam may be effectively mitigated to achieve better optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, comprising: a first excitation light source, a second excitation light source, and a first diffusion element, wherein
   the first excitation light source is configured to emit a first excitation light beam, the second excitation light source is configured to emit a second excitation light beam, and the first excitation light beam and the second excitation light beam have different colors; and
   the first diffusion element is disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam,
   wherein a first shortest distance is between the first diffusion region and a central axis of the first diffusion element in a radial direction, a second shortest distance is between the second diffusion region and the central axis of the first diffusion element in the radial direction, and the first shortest distance is different from the second shortest distance.

2. The illumination system as claimed in claim 1, wherein the first diffusion region is located between the second diffusion region and the central axis, or the second diffusion region is located between the first diffusion region and the central axis.

3. The illumination system as claimed in claim 1, wherein the first diffusion region and the second diffusion region are in g shapes.

4. The illumination system as claimed in claim 1, wherein the first diffusion element is a rotating member, and rotates with the central axis as a rotation axis.

5. The illumination system as claimed in claim 1, wherein the first excitation light source and the second excitation light source are located on a same side of the first diffusion element.

6. The illumination system as claimed in claim 1, wherein the first excitation light source and the second excitation light source are respectively located on different sides of the first diffusion element.

7. An illumination system, configured to provide an illumination light beam, comprising: a first excitation light source, a second excitation light source, and a first diffusion element, wherein
   the first excitation light source is configured to emit a first excitation light beam, the second excitation light source is configured to emit a second excitation light beam, and the first excitation light beam and the second excitation light beam have different colors;
   the first diffusion element is disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam; and
   the at least one of the first excitation light beam and the second excitation light beam is incident to the first diffusion region from a first surface of the first diffusion element, and is incident to the second diffusion region from a second surface of the first diffusion element, and the first surface is opposite to the second surface.

8. An illumination system, configured to provide an illumination light beam, comprising: a first excitation light source, a second excitation light source, and a first diffusion element, wherein
   the first excitation light source is configured to emit a first excitation light beam, the second excitation light source is configured to emit a second excitation light beam, and the first excitation light beam and the second excitation light beam have different colors;
   the first diffusion element is disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam; and
   the at least one of the first excitation light beam and the second excitation light beam passes through the first diffusion region from a first end of the first diffusion element, and passes through the second diffusion region from a second end of the first diffusion element, and the first end and the second end are respectively located on two opposite sides of a central axis of the first diffusion element.

9. An illumination system, configured to provide an illumination light beam, comprising: a first excitation light source, a second excitation light source, and a first diffusion element, wherein
   the first excitation light source is configured to emit a first excitation light beam, the second excitation light source is configured to emit a second excitation light beam, and the first excitation light beam and the second excitation light beam have different colors;

the first diffusion element is disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam; and the illumination system further comprises a second diffusion element, wherein the second diffusion element is disposed on the transmission paths of the first excitation light beam and the second excitation light beam from the first diffusion element.

10. The illumination system as claimed in claim 9, wherein a diffusion degree of the second diffusion element is less than the diffusion degrees of the first diffusion region and the second diffusion region of the first diffusion element.

11. The illumination system as claimed in claim 1, wherein the first excitation light beam sequentially passes through the first diffusion region and the second diffusion region, and the second excitation light beam passes through the first diffusion region or the second diffusion region.

12. An illumination system, configured to provide an illumination light beam, comprising: a first excitation light source, a second excitation light source, and a first diffusion element, wherein the first excitation light source is configured to emit a first excitation light beam, the second excitation light source is configured to emit a second excitation light beam, and the first excitation light beam and the second excitation light beam have different colors;

the first diffusion element is disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam; and the first excitation light beam is incident to the first diffusion region from a first surface of the first diffusion element, the second excitation light beam is incident to the first diffusion region or the second diffusion region from a second surface of the first diffusion element, and the first surface is opposite to the second surface.

13. The illumination system as claimed in claim 1, wherein the first excitation light beam and the second excitation light beam are incident to the second diffusion region from a same surface of the first diffusion element.

14. The illumination system as claimed in claim 1, wherein the first excitation light beam and the second excitation light beam are perpendicularly incident to the first diffusion element.

15. An illumination system, configured to provide an illumination light beam, comprising: a first excitation light source, a second excitation light source, and a first diffusion element, wherein the first excitation light source is configured to emit a first excitation light beam, the second excitation light source is configured to emit a second excitation light beam, and the first excitation light beam and the second excitation light beam have different colors;

the first diffusion elements disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam; and the first excitation light beam and the second excitation light beam are obliquely incident with respect to the first diffusion element.

16. The illumination system as claimed in claim 15, wherein the first excitation light beam and the second excitation light beam are obliquely incident with respect to the first diffusion element at an angle of 45 degrees.

17. An illumination system, configured to provide an illumination light beam, comprising: a first excitation light source, a second excitation light source, and a first diffusion element, wherein the first excitation light source is configured to emit a first excitation light beam, the second excitation light source is configured to emit a second excitation light beam, and the first excitation light beam and the second excitation light beam have different colors, the first diffusion element is disposed on transmission paths of the first excitation light beam and the second excitation light beam, the first diffusion element comprises a first diffusion region and a second diffusion region having different diffusion degrees, wherein at least one of the first excitation light beam and the second excitation light beam sequentially passes through the first diffusion region and the second diffusion region, and the illumination light beam comprises the first excitation light beam and the second excitation light beam; and the illumination system further comprises two focusing lenses, wherein one of the two focusing lenses is located on the transmission path of the first excitation light beam and is disposed between the first excitation light source and the first diffusion element, and the other one of the two focusing lenses is located on the transmission path of the second excitation light beam and is disposed between the second excitation light source and the first diffusion element, and the first diffusion region or the second diffusion region of the first diffusion element is disposed at a focal position of the two focusing lenses.

18. The illumination system as claimed in claim 1, further comprising a light transmitting module, wherein the light transmitting module is configured to transmit the at least one of the first excitation light beam and the second excitation light beam from the first diffusion region to the second diffusion region.

19. A projection apparatus, comprising:

the illumination system as claimed in claim 1, configured to provide an illumination light beam;

at least one light valve, disposed on a transmission path of the illumination light beam to modulate the illumination light beam into an image light beam; and a projection lens, disposed on a transmission path of the image light beam.

\* \* \* \* \*